United States Patent
Courter et al.

(10) Patent No.: US 12,125,134 B2
(45) Date of Patent: Oct. 22, 2024

(54) GPU MATERIAL ASSIGNMENT FOR 3D PRINTING USING 3D DISTANCE FIELDS

(71) Applicant: Stratasys Ltd., Rehovot (IL)

(72) Inventors: Blake Zachary Courter, Reading, MA (US); Stephen Demai, Cambridge, MA (US)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 18/130,448

(22) Filed: Apr. 4, 2023

(65) Prior Publication Data

US 2023/0252720 A1 Aug. 10, 2023

Related U.S. Application Data

(63) Continuation of application No. 17/329,227, filed on May 25, 2021, now Pat. No. 11,625,889, which is a
(Continued)

(51) Int. Cl.
| | |
|---|---|
| *G06T 15/08* | (2011.01) |
| *B29C 64/386* | (2017.01) |
| *B29C 64/393* | (2017.01) |
| *B33Y 50/02* | (2015.01) |
| *G03G 15/22* | (2006.01) |

(Continued)

(52) U.S. Cl.
CPC ............ *G06T 15/08* (2013.01); *B29C 64/393* (2017.08); *B33Y 50/02* (2014.12); *G06F 30/00* (2020.01); *G06T 1/20* (2013.01); *G06T 15/005* (2013.01); *G06T 15/503* (2013.01); *B29C 64/386* (2017.08); *G03G 15/224* (2013.01)

(58) Field of Classification Search
None
See application file for complete search history.

(56) References Cited

U.S. PATENT DOCUMENTS

| | | |
|---|---|---|
| 5,503,785 A | 4/1996 | Crump et al. |
| 6,004,124 A | 12/1999 | Swanson et al. |
| (Continued) | | |

FOREIGN PATENT DOCUMENTS

| | | |
|---|---|---|
| WO | WO 2016/094814 | 6/2016 |
| WO | WO 2017/147412 | 8/2017 |

OTHER PUBLICATIONS

Communication Pursuant to Article 94(3) EPC Dated Sep. 24, 2020 From the European Patent Office Re. Application No. 17710093.0. (13 Pages).
(Continued)

*Primary Examiner* — Frank S Chen

(57) ABSTRACT

A system for generating slice data for additive manufacturing, comprises a graphics processing unit (GPU) that receives a digital model of an object in a three-dimensional build space defined over a plurality of slices, computes a three-dimensional signed distance field over voxels in the build space, assigns a building material to each voxel based on a respective distance field value, and generates slice data output pertaining to the building material assignments for each slice. The slice data output can be used for printing the object in layers corresponding to the slices. The distance field comprises one or more vector having a vertical component with respect to the slices.

20 Claims, 20 Drawing Sheets

Related U.S. Application Data continuation of application No. 16/594,026, filed on Oct. 6, 2019, now Pat. No. 11,024,075, which is a continuation of application No. 15/517,436, filed as application No. PCT/US2017/019340 on Feb. 24, 2017, now abandoned.

(60) Provisional application No. 62/299,819, filed on Feb. 25, 2016.

(51) Int. Cl.
| | | |
|---|---|---|
| *G06F 30/00* | (2020.01) | |
| *G06T 1/20* | (2006.01) | |
| *G06T 15/00* | (2011.01) | |
| *G06T 15/50* | (2011.01) | |

(56) References Cited

U.S. PATENT DOCUMENTS

| | | | |
|---|---|---|---|
| 7,384,255 | B2 | 6/2008 | La Bossiere et al. |
| 7,604,470 | B2 | 10/2009 | La Bossiere et al. |
| 7,896,209 | B2 | 3/2011 | Batchelder et al. |
| 7,897,074 | B2 | 3/2011 | Batchelder et al. |
| 8,147,910 | B2 | 4/2012 | Kritchman |
| 8,153,182 | B2 | 4/2012 | Comb et al. |
| 8,403,658 | B2 | 3/2013 | Swanson |
| 8,488,994 | B2 | 7/2013 | Hanson et al. |
| 8,647,102 | B2 | 2/2014 | Swanson et al. |
| 8,818,544 | B2 | 8/2014 | Nehme et al. |
| 8,879,957 | B2 | 11/2014 | Hanson et al. |
| 9,022,769 | B2 | 5/2015 | Swanson et al. |
| 9,227,365 | B2 | 1/2016 | Dikovsky et al. |
| 10,318,654 | B2 | 6/2019 | Shtilerman |
| 2005/0154481 | A1 | 7/2005 | Berger et al. |
| 2006/0003152 | A1 | 1/2006 | Youngs |
| 2010/0191360 | A1 | 7/2010 | Napadensky et al. |
| 2013/0078073 | A1 | 3/2013 | Comb et al. |
| 2013/0161432 | A1 | 6/2013 | Mannella et al. |
| 2013/0161442 | A1 | 6/2013 | Mannella et al. |
| 2013/0186558 | A1 | 7/2013 | Comb et al. |
| 2014/0158802 | A1 | 6/2014 | Batchelder et al. |
| 2014/0312535 | A1 | 10/2014 | Dikovsky et al. |
| 2014/0324204 | A1 | 10/2014 | Vidimce et al. |
| 2015/0182811 | A1 | 7/2015 | Bender |
| 2015/0258770 | A1 | 9/2015 | Chan et al. |
| 2016/0019319 | A1 | 1/2016 | Shtilerman |
| 2016/0101570 | A1* | 4/2016 | Iorio .................. B29C 64/393 700/98 |
| 2016/0151979 | A1 | 6/2016 | Urban et al. |
| 2016/0167306 | A1 | 6/2016 | Vidimce et al. |
| 2016/0185001 | A1 | 6/2016 | Leason |
| 2016/0257077 | A1 | 9/2016 | Brown |
| 2016/0259866 | A1 | 9/2016 | Bigos et al. |
| 2016/0314617 | A1 | 10/2016 | Forster et al. |
| 2017/0015057 | A1 | 1/2017 | Stevens et al. |
| 2017/0053438 | A1 | 2/2017 | Huang et al. |
| 2017/0372513 | A1 | 12/2017 | Zeng et al. |
| 2018/0001565 | A1 | 1/2018 | Hocker |
| 2018/0032060 | A1 | 2/2018 | Zeng et al. |
| 2018/0133956 | A1 | 5/2018 | Buller et al. |
| 2018/0240263 | A1 | 8/2018 | Courter et al. |
| 2020/0035015 | A1 | 1/2020 | Courter et al. |
| 2021/0279944 | A1 | 9/2021 | Courter et al. |

OTHER PUBLICATIONS

International Preliminary Report on Patentability Dated Aug. 28, 2018 From the International Bureau of WIPO Re. Application No. PCT/US2017/019340. (10 Pages).

International Search Report and the Written Opinion Dated Jun. 9, 2017 From the International Searching Authority Re. Application No. PCT/US2017/019340. (12 Pages).

Notice of Allowance Dated Feb. 5, 2021 From the US Patent and Trademark Office Re. U.S. Appl. No. 16/594,026. (13 Pages).

Notice of Allowance Dated Dec. 13, 2022 from the US Patent and Trademark Office Re. U.S. Appl. No. 17/329,227. (16 pages).

Notice of Reason for Rejection Dated Oct. 29, 2019 From the Japan Patent Office Re. Application No. 2018-544480 and Its Translation Into English. (9 Pages).

Notice of Reason(s) for Rejection Dated Jan. 18, 2022 From the Japan Patent Office Re. Application No. 2014-513308 and Its Translation Into English. (8 Pages).

Notice of Reason(s) for Rejection Dated Aug. 31, 2021 From the Japan Patent Office Re. Application No. 2020-114221 and Its Translation Into English. (10 Pages).

Official Action Dated May 6, 2019 From the US Patent and Trademark Office Re. U.S. Appl. No. 15/517,436. (19 Pages).

Official Action Dated Oct. 22, 2018 From the US Patent and Trademark Office Re. U.S. Appl. No. 15/517,436. (15 Pages).

Official Action Dated Jun. 25, 2018 From the US Patent and Trademark Office Re. U.S. Appl. No. 15/517,436. (22 Pages).

Summons to Attend Oral Proceedings Pursuant to Rule 115(1) EPC Dated Dec. 8, 2021 From the European Patent Office Re. Application No. 17710093.0. (14 Pages).

* cited by examiner

GPU MATERIAL ASSIGNMENT FOR 3D PRINTING USING 3D DISTANCE FIELDS

RELATED APPLICATIONS

This application is a continuation of U.S. patent application Ser. No. 17/329,227, filed on May 25, 2021, which is a continuation of U.S. patent application Ser. No. 16/594,026, filed on Oct. 6, 2019, now U.S. Pat. No. 11,024,075, which is a continuation of U.S. patent application Ser. No. 15/517,436, filed Apr. 6, 2017, which is a Section 371 National Stage Application of International Application No. PCT/US2017/019340, filed Feb. 24, 2017, which claims priority to U.S. Patent Application No. 62/299,819, filed Feb. 25, 2016. The contents of the above applications are all incorporated by reference as if fully set forth herein in their entirety.

FIELD AND BACKGROUND OF THE INVENTION

The present disclosure relates to systems and method for additive manufacturing of three-dimensional (3D) parts, and more particularly, to generating print data for additive manufacturing and using the print data in systems and processes for building 3D parts and their support structures.

Additive manufacturing is generally a process in which a three-dimensional (3D) object is manufactured utilizing a computer model of the objects. The basic operation of an additive manufacturing system consists of slicing a three-dimensional computer model into thin cross sections, translating the result into two-dimensional position data, and feeding the data to control equipment which manufacture a three-dimensional structure in a layer wise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes.

In an ink jet process, a building material is jetted in droplets from a dispensing head having a set of nozzles to deposit layers on a supporting structure. Depending on the fabrication technique and material type, the layers may then be planarized, cured and/or solidified using a suitable device. The building material may include part material, which forms the object, and support material, which supports the object as it is being built.

In a fused deposition modeling additive manufacturing system, a 3D part or model may be printed from a digital representation of the 3D part in a layer-by-layer manner by extruding a flowable part material along toolpaths. The part material is extruded through an extrusion tip carried by a print head of the system, and is deposited as a sequence of roads on a substrate in a build plane. The extruded part material fuses to previously deposited part material, and solidifies upon a drop in temperature. The position of the print head relative to the substrate is then incremented along a print axis (perpendicular to the build plane), and the process is then repeated to form a 3D part resembling the digital representation. Support material is typically deposited from a second nozzle pursuant to the generated geometry during the printing process to build a support structure.

In an electrophotographic 3D printing process, each slice of the digital representation of the 3D part and its support structure is printed or developed using an electrophotographic engine. The electrophotographic engine generally operates in accordance with 2D electrophotographic printing processes, but with a polymeric toner. The electrophotographic engine typically uses a conductive support drum that is coated with a photoconductive material layer, where latent electrostatic images are formed by electrostatic charging, followed by image-wise exposure of the photoconductive layer by an optical source. The latent electrostatic images are then moved to a developing station where the polymeric toner is applied to charged areas, or alternatively to discharged areas of the photoconductive insulator to form the layer of the polymeric toner representing a slice of the 3D part. The developed layer is transferred to a transfer medium, from which the layer is transfused to previously printed layers with heat and/or pressure to build the 3D part.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. A host computer generates additional geometry acting as a support structure for the overhanging or free-space segments of the 3D part being formed. The support material adheres to the modeling material during fabrication, and is removable from the completed 3D part when the printing process is complete.

SUMMARY

A method includes selecting a voxel from a three-dimensional build space and for the selected voxel, determining a distance field value relative to a digital part model in the three-dimensional build space. The distance field value is then used to select at least one material selection rule and a feature of the voxel is applied to the at least one material selection rule to identify a material designation for the voxel. The material designation indicates no material is to be placed at the voxel when the material selection rule identifies no material for the voxel and the material designation indicates at least one material is to be placed at the voxel when the at least one material selection rule identifies the at least one material for the voxel. The material designation for the voxel is then output for use in building a3D part using an additive manufacturing system.

In a further embodiment, an additive manufacturing system includes a graphics processing unit that receives a digital model of a part, performs rendering operations on the digital part model, the rendering operations comprising sequentially rendering the digital part model in a first Z direction to create a first set of z-buffer values for each of a plurality of Z positions, and sequentially rendering the digital part model in a second Z direction, opposite the first Z direction to create a second set of z-buffer values for each of the plurality of Z positions. The graphics processing unit uses the z-buffer values to determine at least one distance field value for each voxel at each of the plurality of Z positions and sets a material designation for each voxel based on the voxel's at least one distance field value. The system further includes a communication interface that transmits the material designations for the voxels to cause a 3D part to be manufactured.

In a still further embodiment, a method includes selecting a voxel in a three-dimensional build space, determining a first distance field value for the voxel relative to a boundary of a digital model of a first part positioned in the three-dimensional build space, and determining a second distance field value for the voxel relative to a boundary of a digital model of a second part positioned in the three-dimensional build space. The first distance field value and the second distance field value are then used to set a material designation for the voxel.

DESCRIPTION OF SPECIFIC EMBODIMENTS OF THE INVENTION

Figure 1:
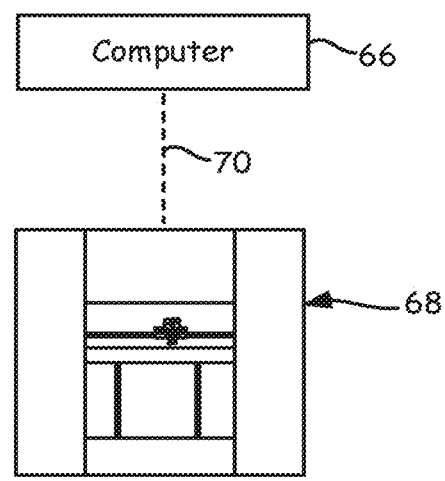
FIG. 1 is an example of a system for printing a 3D part using GPU material assignment based on distance fields.

To build a part using additive manufacturing, print data is generated from a digital model representing an object to be printed. Based on the print data, print instructions are generated and provided to the printer to indicate what material, if any, should be placed in each of the available locations of each printing layer. A known technique for determining material transitions identifies the exterior bounds of each part using boundary representations. In this method, a part material is designated for each location that is positioned along the boundary of the part. If the part is to be solid, the material set for the part is also designated for each location within the boundaries of the part. In this method, all material transitions, either from one material to another material, or from a material to open space, can be described by a boundary representation. However, the present inventors have discovered that relying on boundary representations to control transitions between materials creates several problems. First, performing rounding, lofting and offset modeling operations where boundary representations are shifted inward or outward to produce the print instructions can produce errors or unexpected results due to interference between shifted boundary representations. This typically occurs when the topology of the part is complex. Second, Boolean operations, such as subtraction or union, which are performed between two different parts when generating print instructions, can fail if the boundary representations of the parts do not define an enclosed object. Any opening in the part will cause the Boolean operations to be limited to the boundary representation itself instead of the complete volume of the part. Third, it is extremely difficult to define lattices using boundary representations because the lattices require a huge number of triangles in the mesh, resulting in a large amount of data.

In the embodiments described below, the problems associated with boundary representations are overcome by using distance fields. As used herein, a "distance field value" is the length of the shortest vector between the voxel and the part's mesh boundaries, where the vector is not limited to being in any one plane, axis or direction. In one embodiment, a distance field is created by dividing the three-dimensional build space, which contains the part(s) to be manufactured, into a three-dimensional matrix of voxels. The closest distance from each voxel to a part boundary is then determined such that if the voxel is within the part, the distance is set as a positive value, if the voxel is outside of the part, the distance is set as a negative value and if the voxel is on the part boundary, the distance is zero. This produces a three-dimensional matrix of distance field values. Each part has its own associated distance field. As a result, when there are multiple parts in the build space, each voxel has multiple different distance field values, each associated with a separate part.

Once the distance fields are determined, they are used to select at least one material selection rule for each voxel. Each material selection rule identifies a material designation for the voxel using at least one feature of the voxel such as the distance field value of the voxel and the position of the voxel in the build space, for example. In some embodiments, the material selection rule includes a periodic function that is a function of the distance field values and/or the position in the build space such that one range of output values produced by the periodic function is associated with no material being designated for the voxel and another range of output values produced by the periodic function is associated with a material being designated for the voxel. Such periodic functions allow lattices to be defined in the build space.

FIG. 1 shows an example of a simplified system for assigning materials to voxels and manufacturing parts using the assigned materials. In FIG. 1, a computer 66 acts as a host computer for an additive manufacturing system 68 and communicates with system 68 over one or more communication lines 70. In some embodiments, computer 66 is internal to system 68, such as part of an internal controller assembly for system 68. In other embodiments, computer 66 is external to additive manufacturing system 68.

Figure 2:
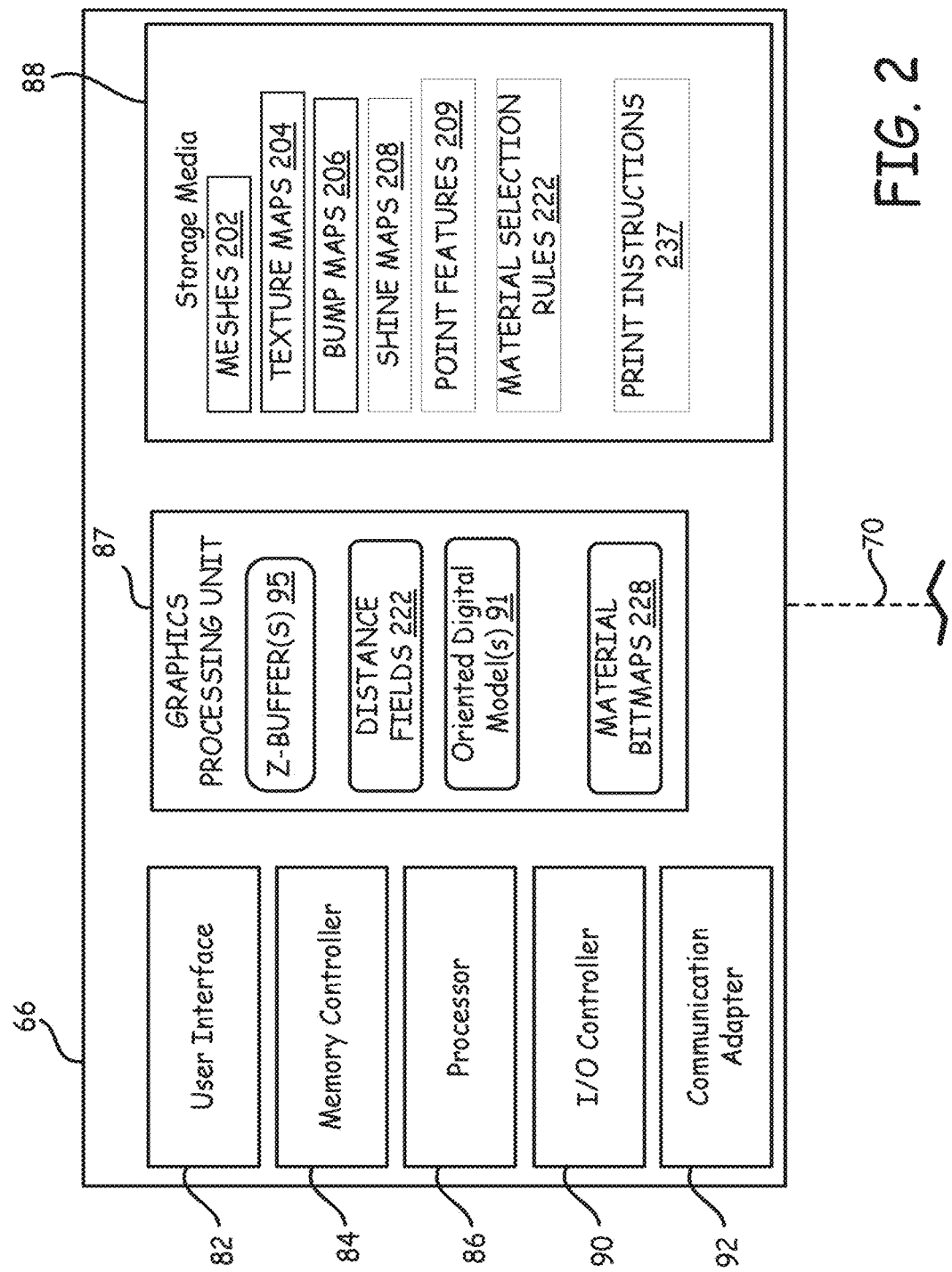
FIG. 2 is a block diagram of an example computer architecture for the computer of FIG. 1.

FIG. 2 shows a block diagram of an example architecture for computer 66. As shown, computer 66 includes suitable computer-based hardware, such as a user interface 82, a memory controller 84, a processor 86, a graphics processing unit 87, a storage media 88, an input/output (I/O) controller 90, and a communication adapter 92. Computer 66 may also include a variety of additional components that are contained in conventional computers, servers, media devices, signal processing devices, and/or printer controllers.

User interface 82 is one or more user-operated interfaces (e.g., keyboards, touch pads, touch-screen displays, display monitors, and other eye, voice, movement, or hand-operated controls) configured to operate computer 66. Memory controller 84 is one or more circuit assemblies that interface the components of computer 66 with one or more volatile random access memory (RAM) modules of storage media 88. Processor 86 is one or more computer-processing units configured to operate computer 66, optionally with memory controller 84, and preferably with related processing circuitry (e.g., programmable gate arrays, digital and analog components, and the like). For instance, processor 86 may include one or more microprocessor-based and/or microcontroller-based units, one or more central processing units, and/or one or more front-end processing units.

Graphics processing unit 87 contains a large number of transistors that are arranged to perform calculations related to 3D computer graphics in a fast an efficient manner. Such calculations include texture mapping and rendering polygons that represent 3D objects.

Storage media 88 is one or more internal and/or external data storage devices or computer storage media for computer 66, such as volatile RAM modules, read-only memory modules, optical media, magnetic media (e.g., hard disc drives), solid-state media (e.g., FLASH memory and solid-state drives), analog media, and the like. Storage media 88 may retain one or more pre-processing and/or post-processing programs (not shown) discussed further below.

I/O controller 90 is one or more circuit assemblies that interface memory controller 84, processor 86, and storage media 88 with various input and output components of computer 66, including user interface 82 and communication adapter 92. Communication adapter 92 is one or more wired and/or wireless transmitter/receiver adapters configured to communicate over communication lines 70.

The commands from computer 66 to the components of systems 68 may be performed with one or more of user interface 82, memory controller 84, processor 86, storage media 88, input/output (I/O) controller 90, communication adapter 92, and/or other suitable hardware and software implementations, as is understood by those skilled in the art.

Figure 3:
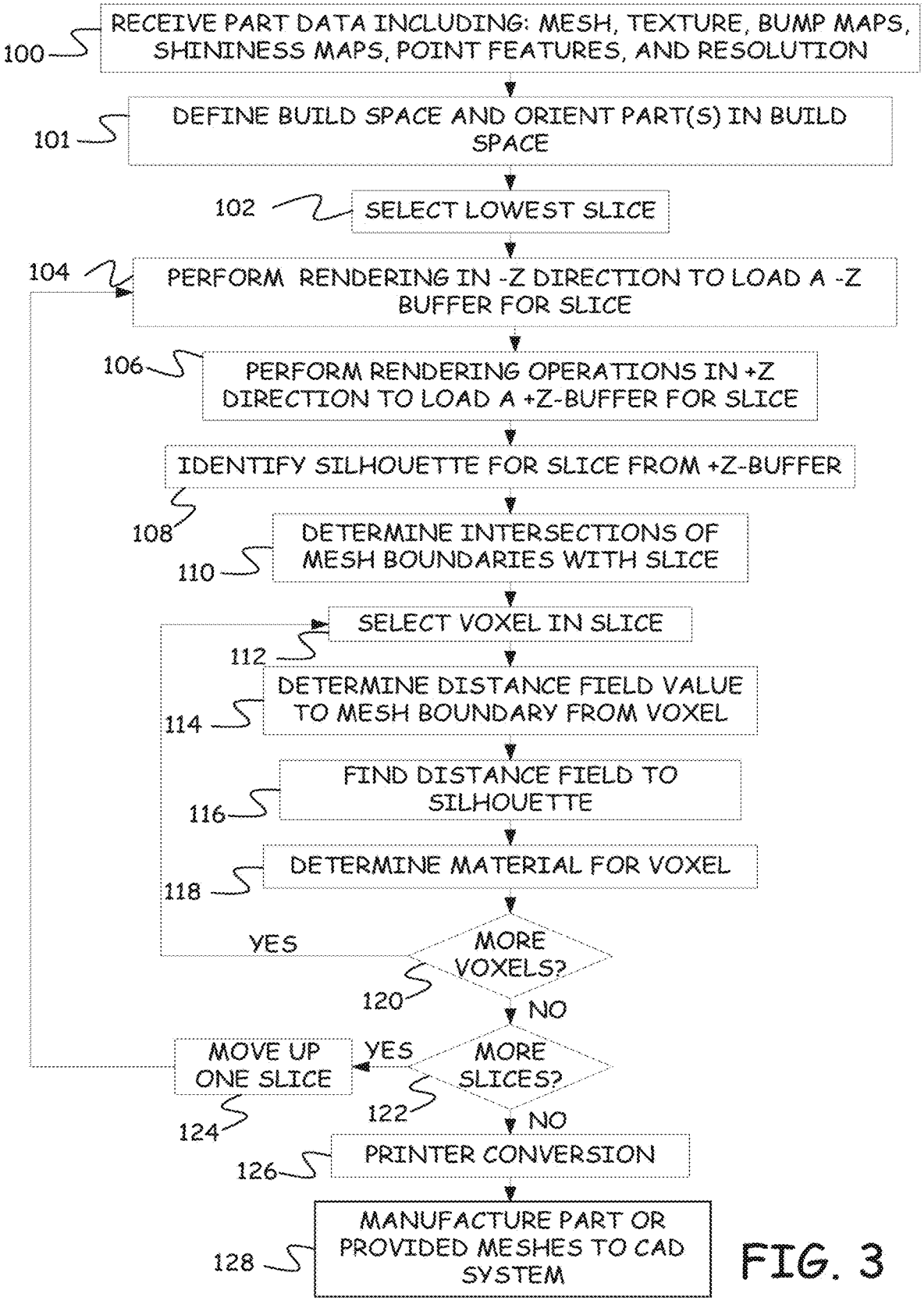
FIG. 3 is a flow diagram of a method of converting a digital part model into print instructions for printing a 3D part.
Figure 4:
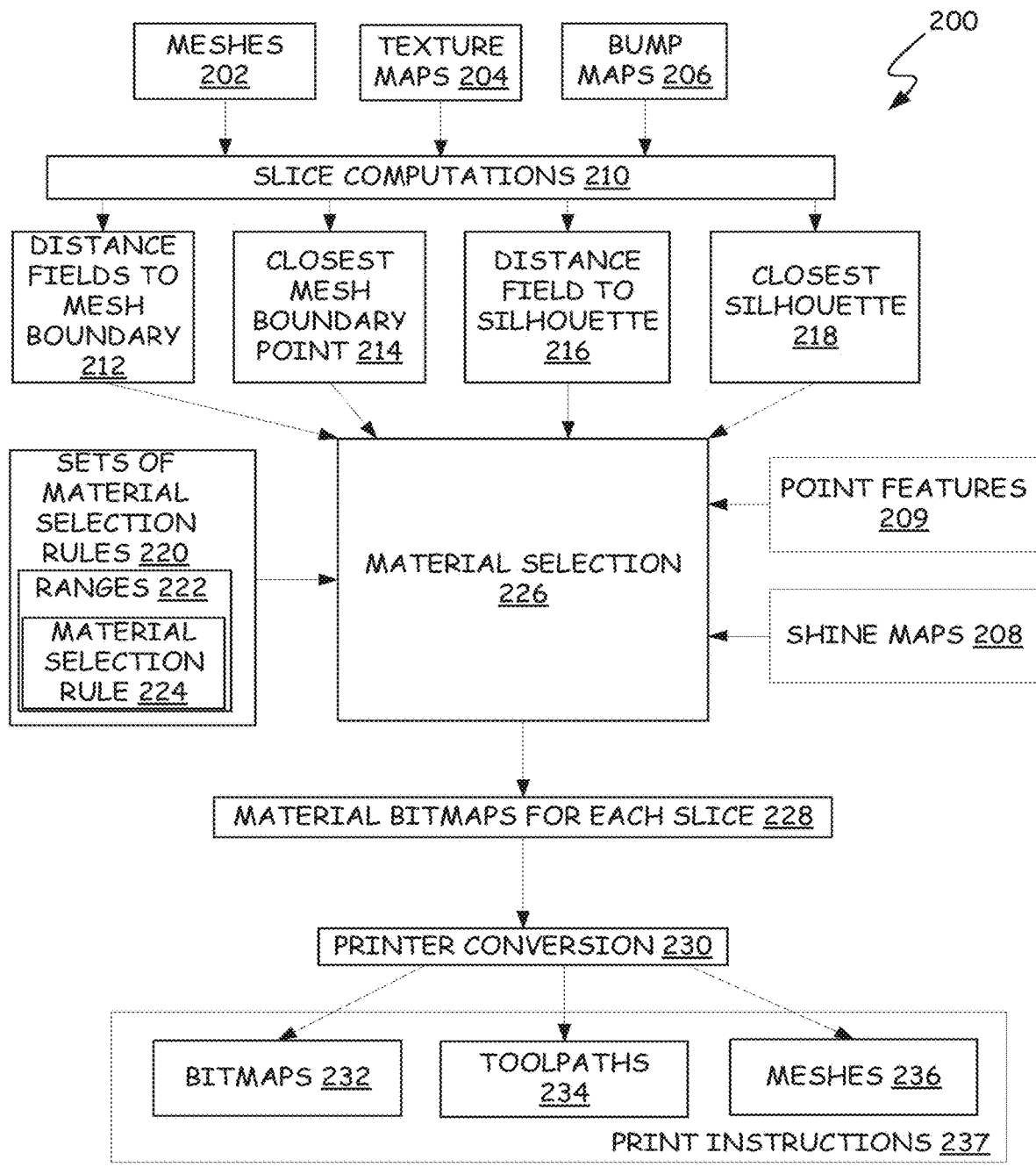
FIG. 4 is a block diagram of elements used in the method of FIG. 3.

FIG. 3 provides a flow diagram of a method of generating print instructions for a 3D part from digital part models using distance fields. FIG. 4 provides a block diagram of a system 200 used to implement the method of FIG. 3. In accordance with one embodiment, system 200 is implemented in computer 66.

Figure 5:
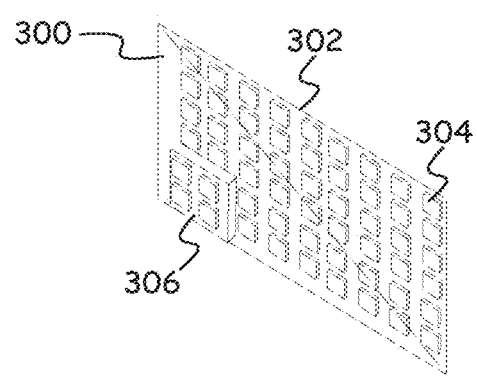
FIG. 5 is a perspective view of a portion of a part showing texture and a bump.

In step 100, part data is received including meshes 202, texture maps 204, bump maps 206, shine maps 208, point features 209 and a part resolution, which are stored in storage media 88. Meshes 202 describe planar boundaries of a digital model of the part and can be defined as interconnected triangles or other polygons. Texture maps 204 describe the location and geometry of surface textures to be applied on the outside of each of the surfaces described by meshes 202. Bump maps 206 provide descriptions of larger surface features present on particular surfaces of the meshes 202. FIG. 5 provides an example of a portion of a part showing two surfaces 300 and 302 having textures marked by the raised squares 304 and a surface bump 306 represented by the large raised square. The small squares 304 would be described in the texture maps 204 while the surface bump 306 would be described in the bump maps 206. Shininess maps 208 indicate a desired level of shine for different surfaces of the part.

Point features 209 describe sets of material selection rules to be used for portions of the part having specific features. Examples of part features that can be used as the basis for assigning sets of material selection rules include identifiers of a body or mesh, surface texture coordinates, and surface normal ranges. Thus, in some embodiments, different portions of a part have different sets of material selection rules such that at the same distance field values, different materials will be used for different areas around the part. A further description of the use of such point features is provided below.

Meshes 202, texture maps 204 and bump maps 206 are provided to a slice computations process 210 executed by graphics processing unit 87, which performs step 101-116, 120, 122 and 124 of FIG. 3 described further below.

At step 101, slice computations process 210 defines a three-dimensional build space and orients the digital part models described by meshes 202, texture maps 204 and bump maps 206 in the three-dimensional build space to form oriented digital part models 91. In accordance with one embodiment, the build space is defined by first orienting the digital part models and then defining a bounding box around the oriented part models to provide a surrounding support structure envelope.

Figure 6:
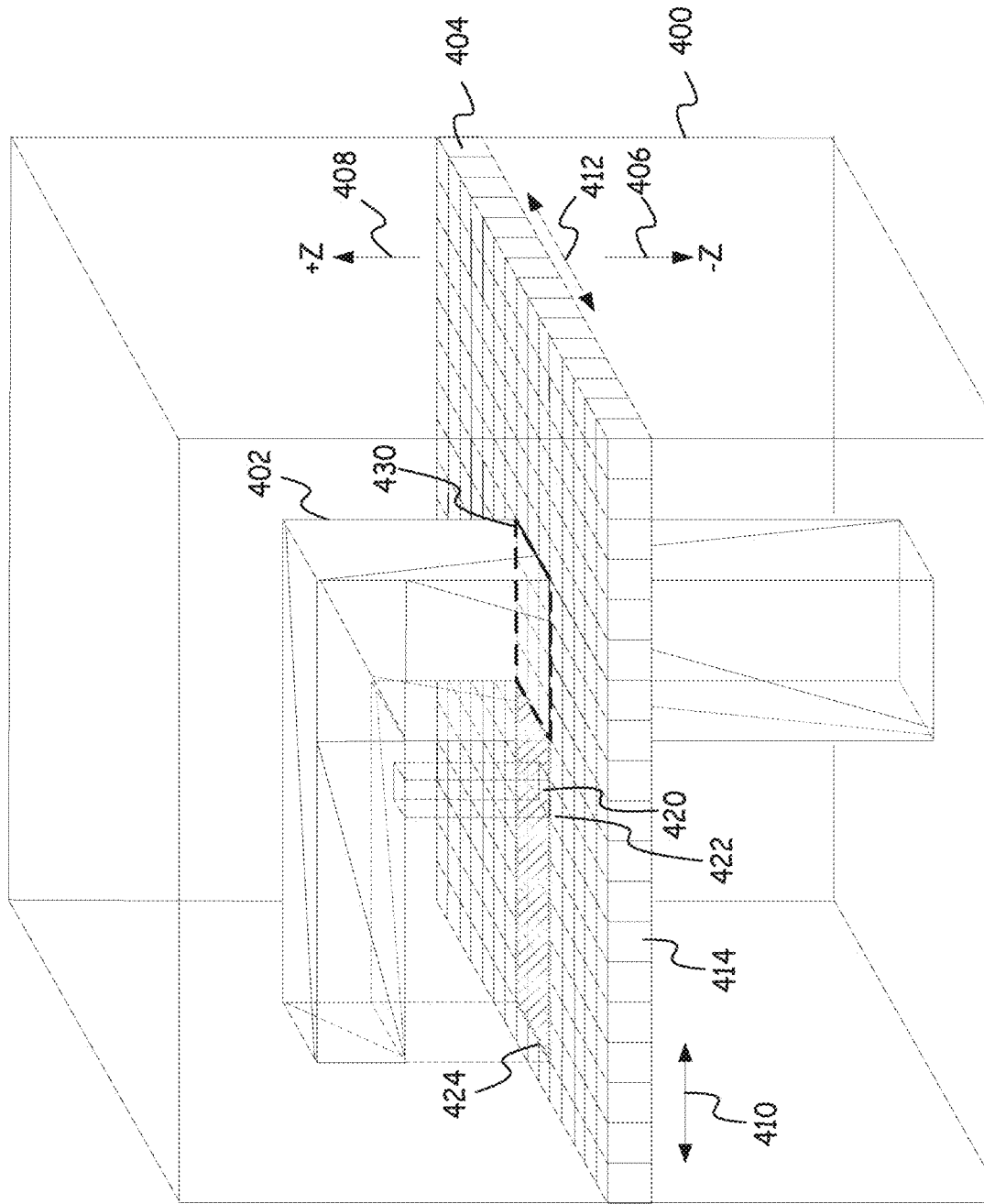
FIG. 6 is a perspective view of a build space with an oriented digital model of a part.

FIG. 6 provides a three-dimensional view of a digital part model 402 oriented in a three-dimensional build space 400. In FIG. 6, there is a −Z direction 406, a +Z direction 408, an X direction 410 and a Y direction 412. A planar slice 404 of build space 400 is shown to include a collection of voxels, such as voxel 414. Although only a single slice is shown in FIG. 6, there are multiple slices in build space 400 such that voxels fill the entirety of build space 400. The dimensions of the voxels are based on the resolution set for the part. In addition, although a planar slice is shown in FIG. 6, the term slice includes any surface-like collection of voxels such as a collection of voxels representing a planar surface, a helical surface, a cylindrical surface, or any other surface geometry.

At step 102, the lowest slice in the build space is selected.

At step 104, slice computations process 210 sets values for a Z buffer 95 for the selected slice in build space 400. The Z buffer for a slice contains a value for each voxel in the slice, where the magnitude of the Z buffer value represents the magnitude of the vertical distance between the voxel and the closest mesh boundary of the part. The mesh boundary of the part is constructed from the combination of one or more meshes 202, texture maps 204 applied to those meshes, and bump maps 206 applied to those meshes. In step 104, this distance is determined by looking in −Z direction 406 from the voxel and the Z buffer is therefore referred to as the −Z buffer. The sign of a value in the Z buffer indicates whether the voxel is inside or outside the digital part model with negative values indicating that the voxel is outside of the digital part model and positive values indicating that the voxel is inside the digital part model. Initially, all of the −Z buffer values for a slice are set to a maximum negative value, which indicates that no portion of the part is visible in −Z direction 406 from any of voxels.

A rendering operation is then performed by GPU 87 using meshes 202, texture maps 204 and bump maps 206 to construct a description of the mesh boundaries of the digital part model in three-dimensional build space 400 and to project that description onto the slice. In particular, each surface in meshes 202 is rendered one at a time and the texture maps 204 and bump maps 206 are applied to the rendered surfaces to produce the mesh boundaries for the surface and the resulting mesh boundaries for the surfaces are projected onto the slice by identifying the voxels that are directly above the mesh boundaries in the three-dimensional build space. For each voxel that is directly above the mesh boundaries of a surface, the distance between the mesh boundary and the voxel is compared to the current distance stored in the −Z buffer for the voxel. If the distance to the surface currently being projected has a smaller magnitude than the value stored in the −Z buffer, the current surface is considered to be closer to the voxel than any previously rendered surfaces of the part and the −Z buffer is updated with the distance to the current mesh boundary. The sign of the distance value stored in the −Z buffer is set to indicate whether the voxel is inside or outside the digital part model. This can be determined based on the angle between the outward normal of the current surface and the +Z direction 408. In accordance with one embodiment, the identity and properties of the current surface are also stored in an additional buffer for the slice.

If the distance between the current mesh boundary and the voxel is larger than the magnitude of the −Z buffer value for the voxel, the −Z buffer value remains unchanged. This will occur when the current surface is obscured from the voxel by another surface of the part, which is closer to the voxel. Thus, after every surface of the part below the current slice has been rendered and projected onto the slice, the −Z buffer contains values indicating the shortest distance in the −Z direction between the voxel and the mesh boundary of the part and a further buffer indicates the identity of those closest surfaces and additional features of those surfaces such as the direction of their outward facing normals. This is repeated for each slice in build space 400.

At step 106, a rendering operation is performed in the +Z direction to load a +Z buffer for the selected slice. This rendering is identical to the rendering performed in the −Z direction with the exception that the view is changed to +Z direction 408. After step 106, the selected slice has a +Z buffer value for each voxel and a −Z buffer value for each voxel where the +Z buffer value provides the shortest vertical distance between the voxel and the part in +Z direction 408 and the −Z buffer value provides the shortest distance between the voxel and the part in −Z direction 406.

Although steps 104 and 106 are described above with reference to one part in build space 400, in other embodiments, digital models for multiple parts are present in build space 400. When multiple digital part models are present in build space 400, a separate −Z buffer and a separate +Z buffer may be created for each part for each slice in build space 400.

At step 108, silhouette boundaries for the selected slice are determined from the +Z buffer(s). In particular, the +Z buffer values for pairs of voxels are examined to identify transitions from a negative value to the greatest magnitude negative value possible. Such transitions represent a boundary between where a portion of a part is above a voxel and no portion of the part is above the voxel's neighbor. An example of such a boundary can be seen in FIG. 6 where voxels 420 and 422 are positioned along such a boundary. Voxel 420 is positioned below digital part model 402 and has a +Z buffer value of −4. Voxel 422, which neighbors voxel 420, is not below any portion of the digital part model and is initialized with the largest possible negative value in the +Z-buffer. Repeating this pairwise comparison for every pair produces silhouette boundaries, such as silhouette boundary 424 where voxels within the boundary are considered to be underneath a portion of the part and voxels outside of the silhouette are not below any portions of a digital part model. Note that when digital models for multiple parts are present in build space 400, step 108 is repeated for each +Z buffer for the slice selected at step 104.

At step 110, slice computations process 210 determines the intersections of mesh boundaries with the current slice. In FIG. 6, the intersection of the mesh boundary and slice 400 is shown as boundary 430, shown in dotted lines. The intersection of the mesh boundaries with the slice can be found by examining the +Z buffer and the −Z buffer to identify neighboring pixels where the Z buffer value changes from a negative value to a value of 0 or from a negative value to a positive value. Such changes in the Z-buffer values indicate a transition from being outside of the digital part model to being within the digital part model. Step 110 is performed for each part's Z buffers.

At step 112, a single voxel in the current slice is selected. At step 114, a distance field value to the part's mesh boundaries is determined for the voxel. This distance field value is the shortest magnitude three-dimensional distance between the voxel and any portion of the part's mesh boundaries. At step 116, the distance to the silhouette boundary is determined for the current voxel.

In accordance with one embodiment, steps 114 and 116 are performed together using a sampling algorithm. One example of such a sampling algorithm is shown in the flow diagram of FIG. 7, which is explained with reference to FIG. 8. In FIG. 8, a top view of a slice 620 is shown with a matrix of voxels, including current voxel 600. A mesh boundary 612 that intersects slice 600 is shown as a solid line and a silhouette boundary 610 is shown as a dotted line.

Figure 7:
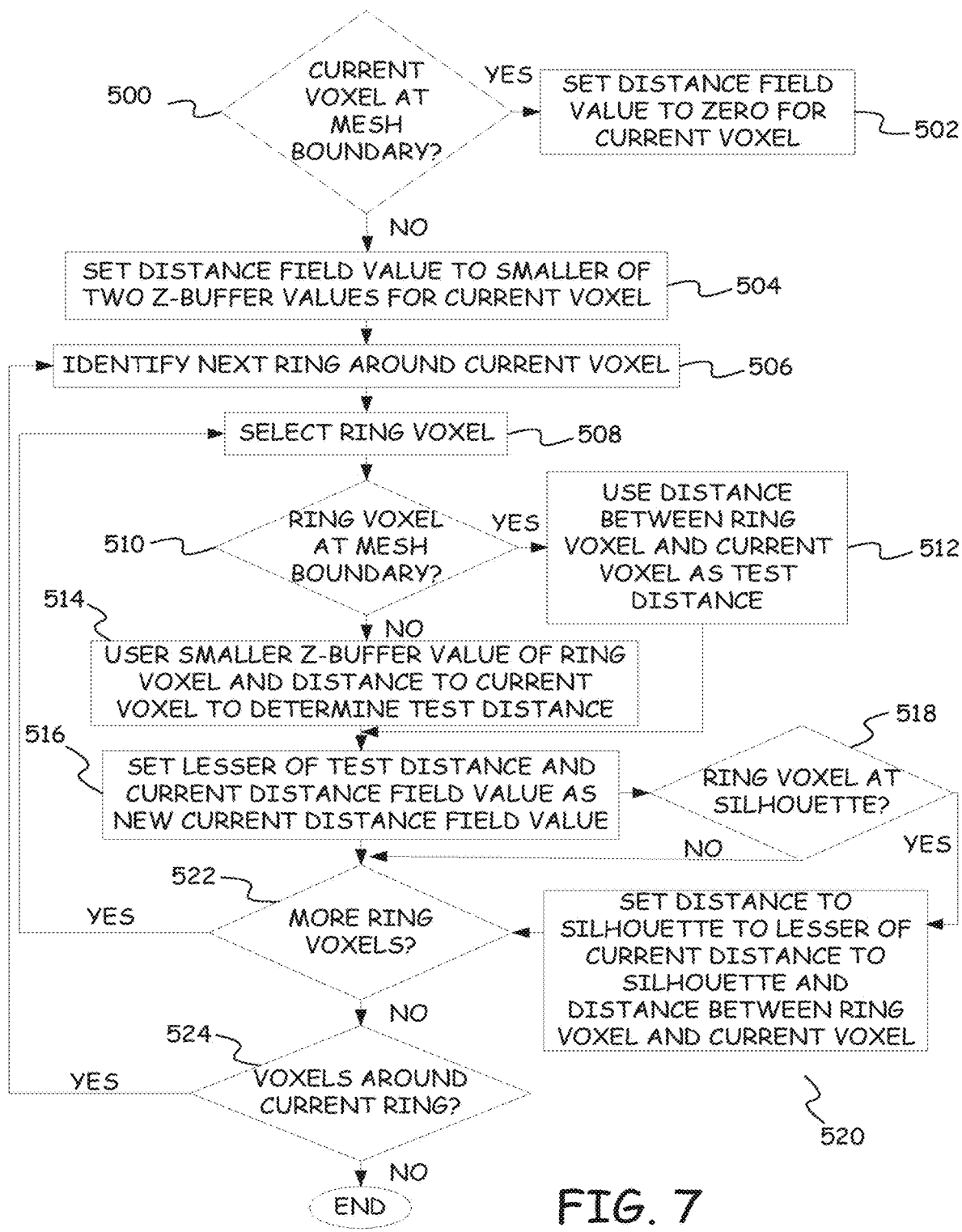
FIG. 7 is a method of determining a distance field value.
Figure 8:
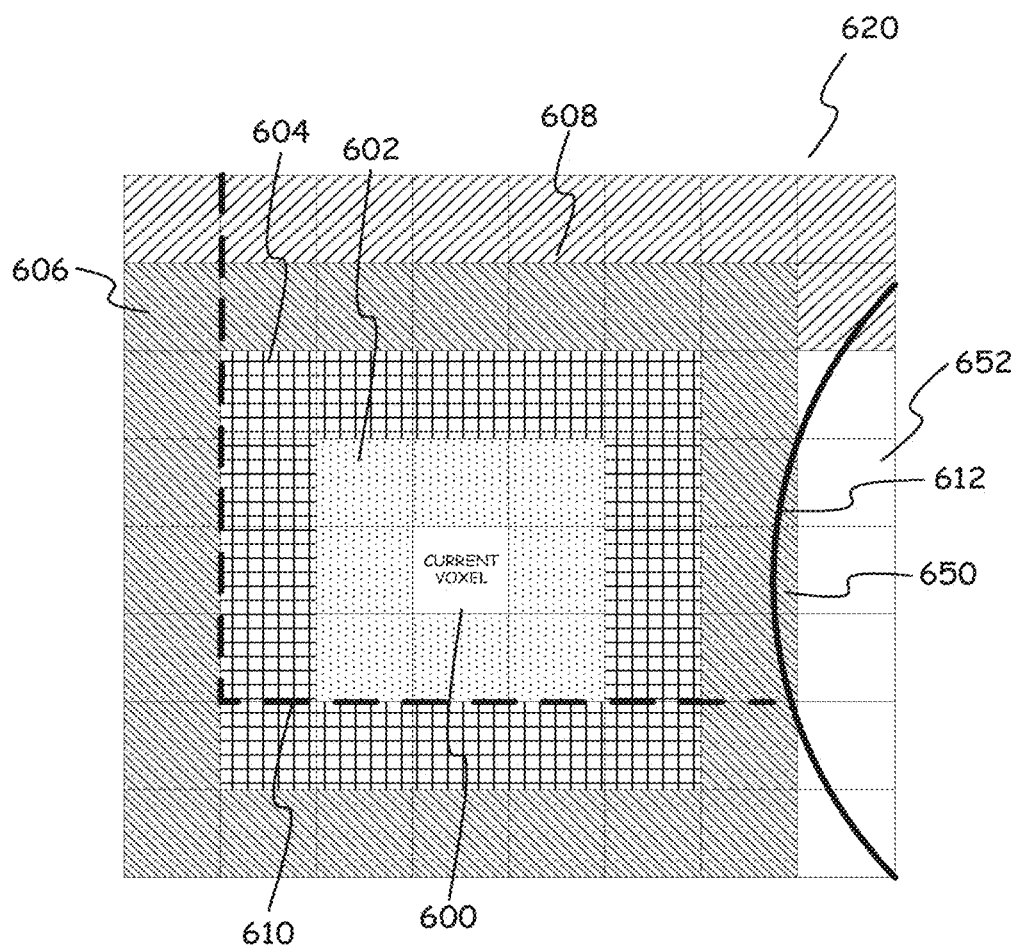
FIG. 8 is a top view of a slice in the build space showing the determination of a distance field value.

At step 500 of FIG. 7, the current voxel, voxel 600 of FIG. 8, is examined to determine if it is at a mesh boundary in the current slice. For example, in FIG. 8, voxel 650 would be considered to be at mesh boundary 612 since mesh boundary 612 intersects with voxel 650. If the current voxel is at the mesh boundary at step 500, the distance field value is set to 0 for the current voxel at step 502.

If the current voxel is not at the mesh boundary at step 500, as is shown with current voxel 600 of FIG. 8, step 504 of FIG. 7 is performed where the distance field value for current voxel 600 is set to the smaller of the two Z-buffer values for the current voxel. In particular, the magnitudes of the Z distance value in the +Z-buffer and −Z-buffer are compared and the smaller magnitude is set as the distance field value for the current voxel. In addition, the sign of the distance field value is set based upon whether the voxel is inside or outside of the digital part model. If the voxel is inside the digital part model, the distance field value is set as a positive value and if the voxel is outside of the digital part model, the distance field value is set to a negative value.

At step 506, a ring of voxels around the current voxel in the current slice is identified. For example, in FIG. 8, a first ring 602 indicated by the dotted shading surrounds current voxel 600. At step 508, a voxel in the identified ring is selected. If this selected ring voxel is at the mesh boundary at step 510, the distance between the selected ring voxel and the current voxel 600 is used as a test distance. If the ring voxel is not at the mesh boundary, a combination of the smaller of the two Z-buffer values for the ring voxel and the distance between the ring voxel and the current voxel is used to determine the test distance at step 514. In particular, the Z-buffer values in the +/−Z-buffer for the ring voxel are compared to each other and the smaller magnitude of the two Z-buffer values is selected as a vertical component of the distance to the digital part model. A horizontal component of the distance of the part is computed as the distance between the ring voxel and the current voxel 600. Squaring the vertical component of the distance and the horizontal component of the distance, summing the squares, and taking the square root of the sum provides the distance between the current voxel 600 and the portions of the part above or below the ring voxel. Note that if no portion of the part is above or below the ring voxel, the Z-buffers will each contain large magnitude values. This approach produces both the 2D planar distance and the 3D distance.

The test distance value computed in either step 512 or 514 is then compared to the current stored distance field value for the current voxel 600 at step 516. If the test distance is less than the current distance field value, the test distance is set as the new current distance field value. If the magnitude of test distance is not less than the magnitude of the current distance field value, the current distance field value remains the same.

At step 518, the method determines if the ring voxel is at the silhouette boundary, such as silhouette boundary 610 of FIG. 8. If the ring voxel is at the silhouette boundary, a shortest distance to the silhouette boundary for current voxel 600 is set to the lesser of a previously stored distance to the silhouette boundary for current voxel 600 and the distance between the ring voxel and the current voxel at step 520. Thus, if the ring voxel is at the silhouette boundary and the distance between the ring voxel and the current voxel is smaller than previously identified distances between the current voxel and the silhouette boundary, the shortest distance between the current voxel 600 and the silhouette boundary is updated to reflect the distance between the ring voxel and the current voxel 600.

If the ring voxel is not at the silhouette boundary or after the distance to the silhouette boundary has been updated, the process of FIG. 7 determines if there are more ring voxels in the current selected ring. If there are more ring voxels, the process returns to step 508 and the next voxel in the current ring is selected. Steps 510-522 are then repeated. When all of the voxels in a current ring have been processed at step 522, the method determines if there are more voxels around the current ring at step 524. If there are more voxels around the current ring at step 524, the process returns to step 506 and the next ring around the current ring of voxels is selected. For example, after ring 602 is processed, ring 604 is processed, then ring 606, then ring 608. In processing successive rings, the mesh boundaries are not crossed. As such, once a mesh boundary is reached, voxels on the other side of the boundary are not processed. For example, voxel 652 is not processed as part of ring 608 since mesh boundary 612 separates voxel 652 from current voxel 600. The same is true for rings of voxels that are processed within a digital part model. Specifically, when a current voxel is located within a digital part model, voxels outside of the digital part model are not used to determine the distance field for the voxel.

When there are no more voxels around the current ring at step 524, the process ends and the distance field value stored for the current voxel is output as the final distance field 212 (FIGS. 2 and 4). This distance field value will have a magnitude representing the shortest distance between the current voxel and any mesh boundary of the digital part model and a sign that will indicate whether the current voxel is within the digital part model or is exterior to the digital part model. In addition, when the distance field value is updated for the current voxel, one or more features associated with the distance field value are also stored such as the position of the closest point on the mesh boundary, identifiers of the body or mesh that the closest point is located on, surface texture coordinates, and the surface normal at the closest point, for example. In accordance with one embodiment, different features of the part have different sets of material selection rules associated with them. As a result, different portions of the part can have different material selection rules associated with it. Similarly, the shortest distance to the silhouette boundary 216 is output as is the location of the closest silhouette boundary point 218.

When there are digital models for multiple parts in build space 400, the steps of FIG. 7 are repeated for each digital part model to generate a distance field value 212, a closest mesh boundary point 214, a closest distance to the silhouette 216 and the closest silhouette boundary point 218 for the voxel for each digital part model. It is possible for a single voxel to be outside of all digital part models, to be located in a single digital part model while outside of other digital part models, or to be located within multiple digital part models.

Figure 9:
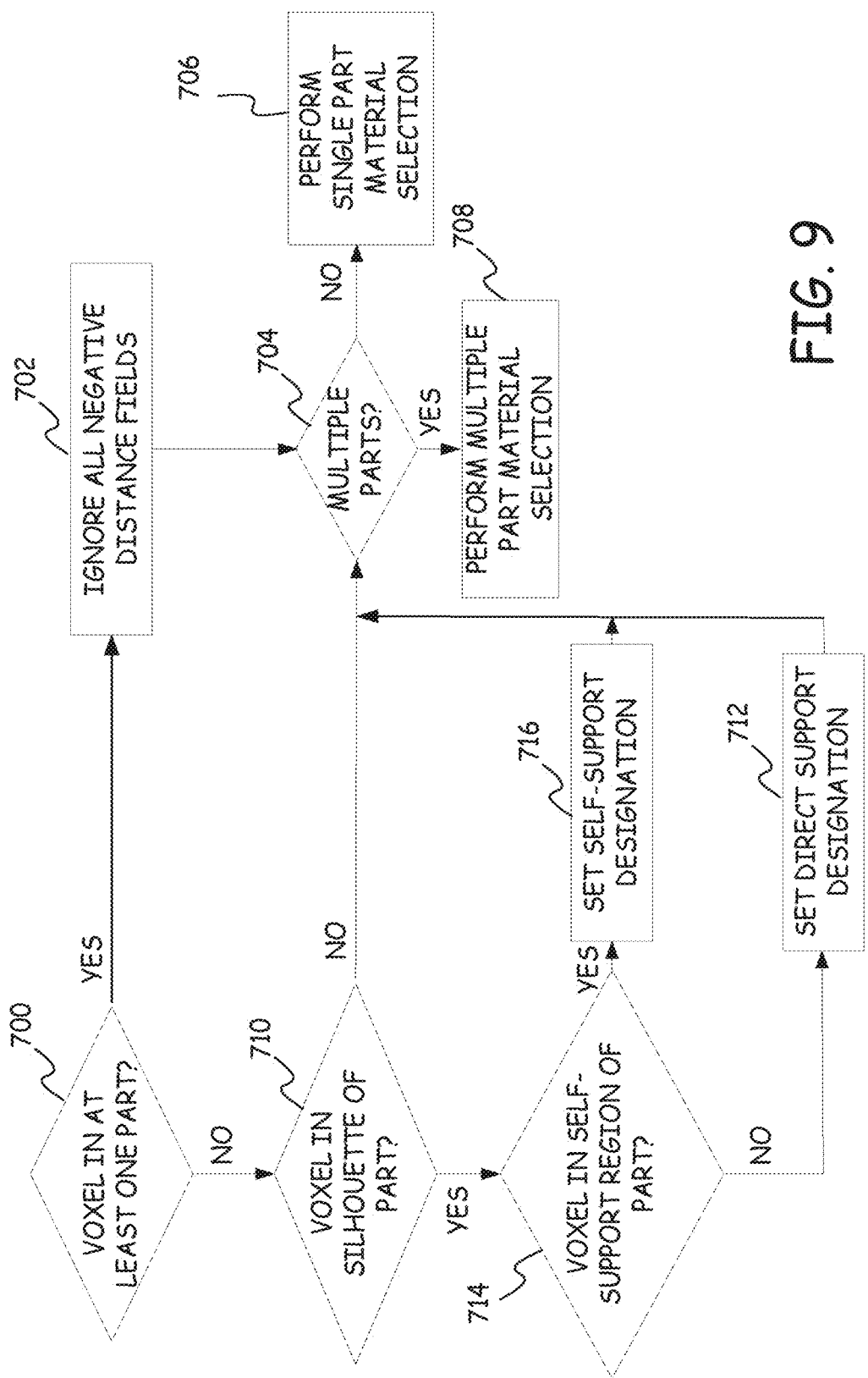
FIG. 9 is a flow diagram of a method of performing initial steps of material selection.

Returning to FIG. 3, after the distance field values and the distance to the silhouette boundary have been determined for the selected voxel at steps 114 and 116, respectively, material for the voxel is determined at step 118 by a material selection unit 226. FIG. 9 provides a flow diagram showing initial steps in performing the material selection.

At step 700, the distance fields are examined to determine if the voxel is in at least one digital part model. This determination can be made by determining if there is at least one non-negative distance field value stored for the voxel. If the voxel is in at least one digital part model, all negative distance field values for the voxel are ignored at step 702. Thus, if a voxel is located within at least one digital part model, the material selection rules 220 associated with the voxel being inside part(s) control the material selection and the material selection rules 220 associated with the voxel being outside of other parts are ignored. Note that if there is only one digital part model in the build space, there will be no negative distance fields to ignore at step 702.

At step 704, material selection unit 226 determines if there are digital models for multiple parts in the build space. If there is only one digital part model in the build space, a single-part material selection process is performed at step 706. An example of one such single-part material identification process is discussed further below. If there are digital models for multiple parts at step 704, a multipart material selection process is performed at step 708. One example of such a multipart material selection process is discussed below.

Returning to step 700, if the voxel is not in any of the digital part models in the build space, the voxel's position relative to the silhouette boundary is examined at step 710 to determine if the voxel is in the silhouette of the part. Determining whether a voxel is in a silhouette of a part involves looking at the +Z-buffer value(s) for the voxel. If any of the +Z-buffer value(s) is negative and has a magnitude less than the maximum magnitude, the voxel is in the silhouette of the part. If the voxel is not in the silhouette of a part, the process continues at step 704 to determine if there are multiple parts in the build space as discussed above.

If the voxel is in the silhouette of the part at step 710, the voxel's position is examined to determine if it is in a self-support region for the part/support structures or is in a direct support region at step 714. A direct support region is a region in the build space located within a silhouette of a digital part model that provides support to the part. Such direct support regions require sufficient support material to support the part as it is built. A self-support region is a region within the silhouette that is below a portion of the part or a portion of the support structure that does not require support while it is built.

Figure 10:
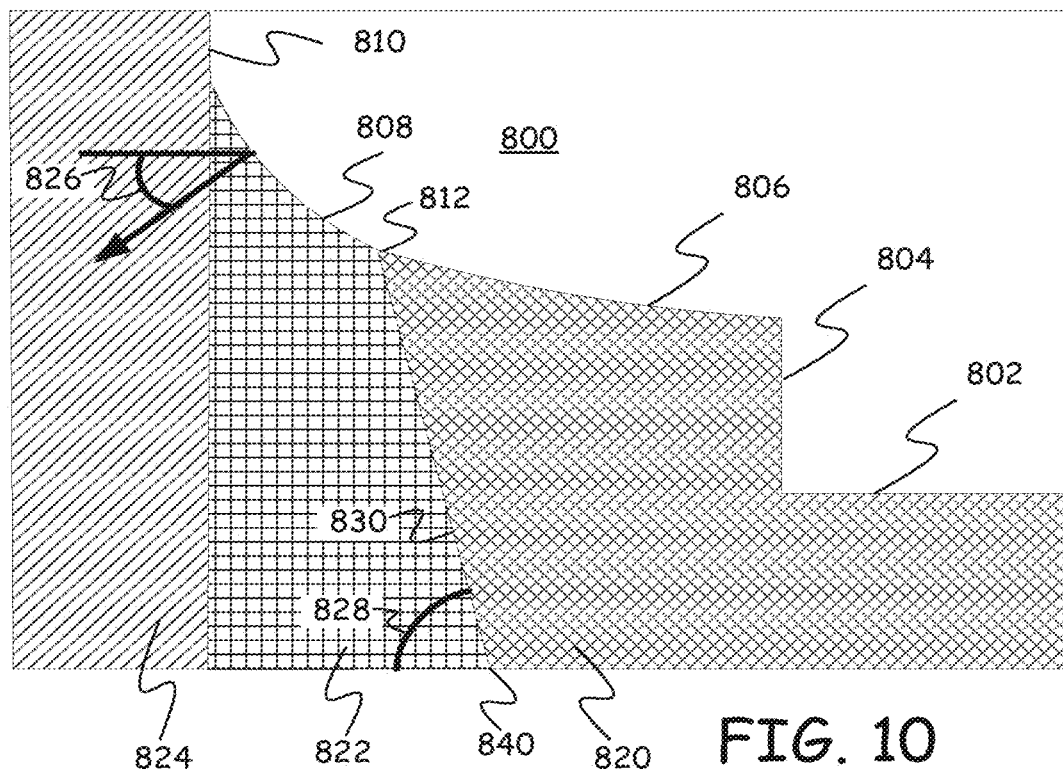
FIG. 10 provides a side view of a part showing different support regions.

The difference between a self-support region and a direct-support region is shown in FIG. 10, which shows a side view of a part 800 having surfaces 802, 804, 806, 808 and 810. There are three regions shown outside of the part: support region 824, direct support region 820 and self-support region 822. Direct support region 820 and self-support region 822 are located below part 800 while support region 824 is not located below any portion of a part.

In accordance with some embodiments, part surfaces that are at more than some set minimum angle to horizontal can be printed without support below them. For example, surfaces 808 and 810 are at a sufficiently large angle to horizontal that they do not require support material below them. Surfaces 806 and 802, on the other hand, are more horizontal than surface 808 and thus require direct support beneath them. In some embodiments, the angle of the part surface to horizontal is determined from the outward normal of the part surface which is stored in surface features 209. The angle between this normal and the horizontal plane, such as angle 826 for surface 808, is compared to a threshold angle and when the angle is less than the threshold angle the voxels below the surface are considered to be in a self-support region.

As shown in FIG. 10, the boundary surface 830 between self-support region 822 and direct support region 820 is at an angle 828 that is less than ninety degrees to the horizontal plane. In some embodiments, this is done to reduce the amount of direct support material that is used to manufacture the part. Like the part, the material of the direct support region can be built without supports below it when the angle of the support surface to the horizontal plane is greater than some minimum angle. In FIG. 10, that minimum angle is angle 828.

Thus, in the area below a part surface that requires direct support, some of the voxels will be in direct support region 820 and some will be in self-support region 822. To determine which region to assign a voxel to, the boundary 812 between direct support surface 806 and self-support surface 808 is identified and this boundary is used with minimum angle 828 to identify the boundary 840 between direct support region 820 and self-support region 822 on the current slice. If the voxel is within self-support region 822 at step 714, a designation that the voxel is in the self-support region is set at step 716. If the voxel is determined to be in direct support region 820 at step 714, a designation that the voxel is in a direct support region is set at step 712. After step 712 or step 716, the process moves to step 704 to determine if there are multiple parts in the build space.

Direct support region 820, self-support region 822 and support region 824 can each include different materials and/or different modulating functions from each other. In general, direct support region 820 will include materials and modulating functions that provide more support than support region 824. Self-support region 822 can include the same materials and modulating functions as direct support region 820 or may include different materials or modulating functions. In some embodiments, voxels in support region 824 and self-support region 822 are assigned no materials.

Figure 11:
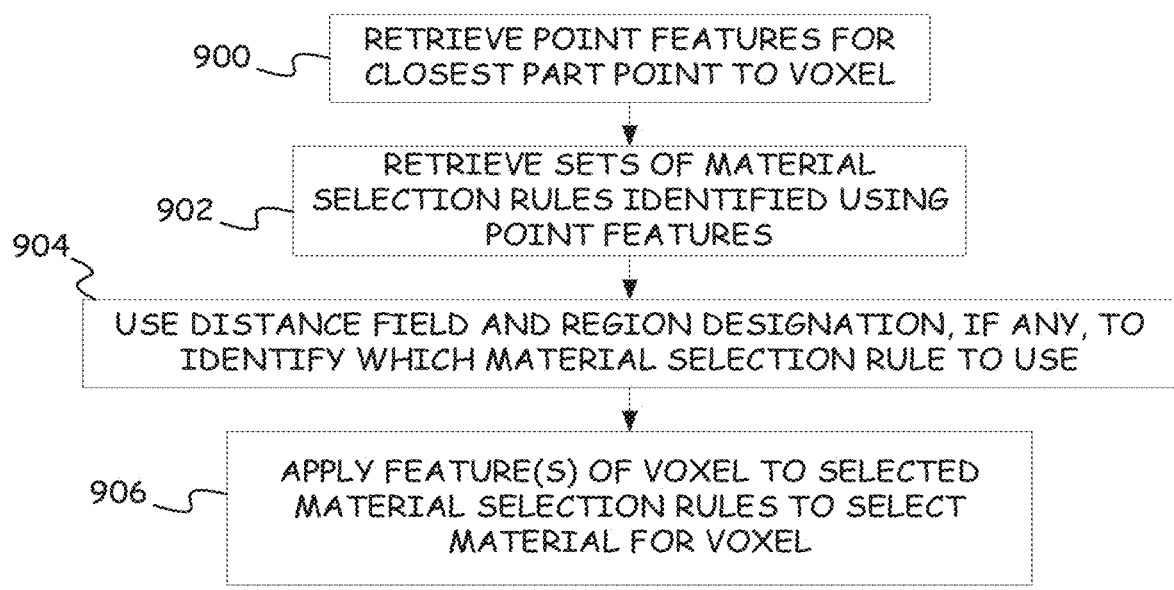
FIG. 11 provides a method of selecting a material for a voxel when there is only one part.

FIG. 11 provides an example flow diagram for performing step 706 of FIG. 9 in which a material identification is performed with respect to a single part in the build space. At step 900 of FIG. 11, point features for the closest portion of the digital part model to the voxel are retrieved from point features 209 by material selection unit 226. These point features are used to identify a set of material selection rules 220 to be used when determining the material for voxels near the part portion. In accordance with one embodiment, the set of material selection rules contains a separate material selection rule 224 for each of a set of ranges 222 of distance field values. In accordance with some embodiments, each material selection rule is one of a static rule that assigns a same material at a same density across the entire range of distance field values, and a modulating rule that varies the composition of the voxels across the range of distance field values.

At step 902, material selection unit 226 retrieves the sets of material selection rules identified in the point features and at step 904 uses the distance field and the region designation (i.e. direct support region, filler region), if any, for the voxel to identify which material selection rule to use.

In accordance with one embodiment, ranges 222 describe bands of materials relative to the mesh boundary where each band has an associated material selection rule 224. Within a range 222, the material selection rule 224 can simply designate a single material to use within the range. For other ranges, the material selection rule 224 consists of one or more functions that are evaluated to produce output values. Groups of output values are assigned to different material designations. For example, some output values of the functions can be assigned to a first material while other output values are assigned to a second material. Other times, one group of output values is assigned to a material while the remaining output values are assigned to no material, meaning that no material is placed in the voxel. For example, in accordance with one embodiment, the following bands and functions are defined:

for a>D>b
    $f(\bar{x}, D)>0$→material designation 1
    $f(\bar{x}, D)<0$→material designation 2
    $f(\bar{x}, D)=0$→material designation 3
for b>D>0
    $g(\bar{x}, D)>0$→material designation 4
    $g(\bar{x}, D)<0$→material designation 5
    $g(\bar{x}, D)=0$→material designation 6
for D=0
    $h(\bar{x})>0$→material designation 7
    $h(\bar{x})<0$→material designation 8
    $h(\bar{x})=0$→material designation 9
or 0>D>−c and direct support
    $k(\bar{x}, D)>0$→material designation 10
    $k(\bar{x}, D)<0$→material designation 11
    $k(\bar{x}, D)=0$→material designation 12
for 0>D>−c and Self-support
    $l(\bar{x}, D)>0$→material designation 13
    $l(\bar{x}, D)<0$→material designation 14
    $l(\bar{x}, D)=0$→material designation 15
for 0>D>−c and nonshine
    $m(\bar{x}, D)>0$→material designation 16
    $m(\bar{x}, D)<0$→material designation 17
    $m(\bar{x}, D)=0$→material designation 18 for 0>D>−c and shine
    $n(\bar{x}, D)>0 \rightarrow$ material designation 19
    $n(\bar{x}, D)<0 \rightarrow$ material designation 20
    $n(\bar{x}, D)=0 \rightarrow$ material designation 21
for −c>D>−d and direct support
    $o(\bar{x}, D)>0 \rightarrow$ material designation 21
    $o(\bar{x}, D)<0 \rightarrow$ material designation 22
    $o(\bar{x}, D)=0 \rightarrow$ material designation 23
for −c>D>−d and Self-support
    $p(\bar{x}, D)>0 \rightarrow$ material designation 24
    $p(\bar{x}, D)<0 \rightarrow$ material designation 25
    $p(\bar{x}, D)=0 \rightarrow$ material designation 26
for −c>D>−d and otherwise
    $q(\bar{x}, D)>0 \rightarrow$ material designation 27
    $q(\bar{x}, D)<0 \rightarrow$ material designation 28
    $q(\bar{x}, D)=0 \rightarrow$ material designation 29 where D is the distance field value, a, b, −c and −d are range values for the distance field values, $\bar{x}$ is the three-dimensional location of the voxel in the build space, $f(\bar{x}, D)$, $g(\bar{x}, D)$, $h(\bar{x}, D)$, $k(\bar{x}, D)$, $l(\bar{x}, D)$, $m(\bar{x}, D)$, $n(\bar{x}, D)$, $o(\bar{x}, D)$, $p(\bar{x}, D)$, and $q(\bar{x}, D)$ are modulating functions and material designations 1-29 are possible materials and no materials to be used for the voxel. Although listed as separate materials 1-29, those skilled in the art will recognize that one or more of the material designations may be the same.

The modulating functions can be periodic or aperiodic functions of one or more features of the voxel such as the voxel's position in the build space, or the distance field D for the voxel. For periodic functions, the position in the build space or the distance field or a combination of these two values can be used to control the frequency of the periodic function, a spatial shift in the periodic function and/or the magnitude of the periodic function. The modulating function can also be a noise function based on the voxel's position in the build space or based on the distance field. In further embodiments, the modulating function is a combination of a periodic function and a procedural noise function. For example, in one embodiment, the periodic function is based on both the position in the build space and the distance field and the output of the periodic function is modulated by a noise function based on the voxel's position in the build space. In a still further embodiment, the modulating function is the sum of the distance field value and a base periodic function of the voxel position in the build space.

In the examples above, three ranges of values for the functions have been described with three associated material designations. When the modulating function provides a constant value, only a single material will be identified producing a band of solid material across the range set by the distance field. In other embodiments, other ranges of values for output of the modulating function are used allowing for any number of materials to be used within the range of distance field values set for the modulating function. In further embodiments, one or more of the ranges of values for the modulating function can be associated with empty space resulting in no material being assigned to the voxel. For example, it is possible to assign a material when the output of the modulating function is greater than or equal to 0 and to assign an empty space to the voxel when the output of the modulating function is less than 0. This allows a porous band of material to be constructed with the porosity of the material changing as a function of the distance field and/or the position in the build space.

The frequency of the modulating function can change as a continuous function of the distance field or can be fixed at the value of the distance field at the beginning or the end of the range of distance fields associated with the modulating function. Similarly, the amplitude of the modulating function can similarly vary continuously as a function of the distance field values or can be set to the value of the distance field at the beginning or ending range of distance field values associated with the modulating function.

As shown in the example set of material selection rules above, the selection of a material selection rule can also be based upon whether the voxel is located in a direct support region or a self-support region as designated for the voxel in step 712 and 716 above. In addition, shine maps 208 can be consulted for the portion of the part closest to the voxel to determine whether that portion of the part is to have a particular shine level. This shine level can then be used together with the distance field to select the material selection rule to apply varying materials to the voxels neighboring the selected voxel, creating varying shininess on the surface.

Returning to FIG. 11, at step 906, the distance field value of the voxel and/or the build space position of the voxel are applied to the selected material selection rule to select a material or no material for the voxel. In some embodiments, as shown above, the material selection rule 224 is a function of a feature of the voxel, such as the distance field value or the build space position of the voxel, and the distance field value and or the build space position of the voxel are applied to the function to generate an output value that is then used to select the material or lack of material for the voxel.

Figure 12:
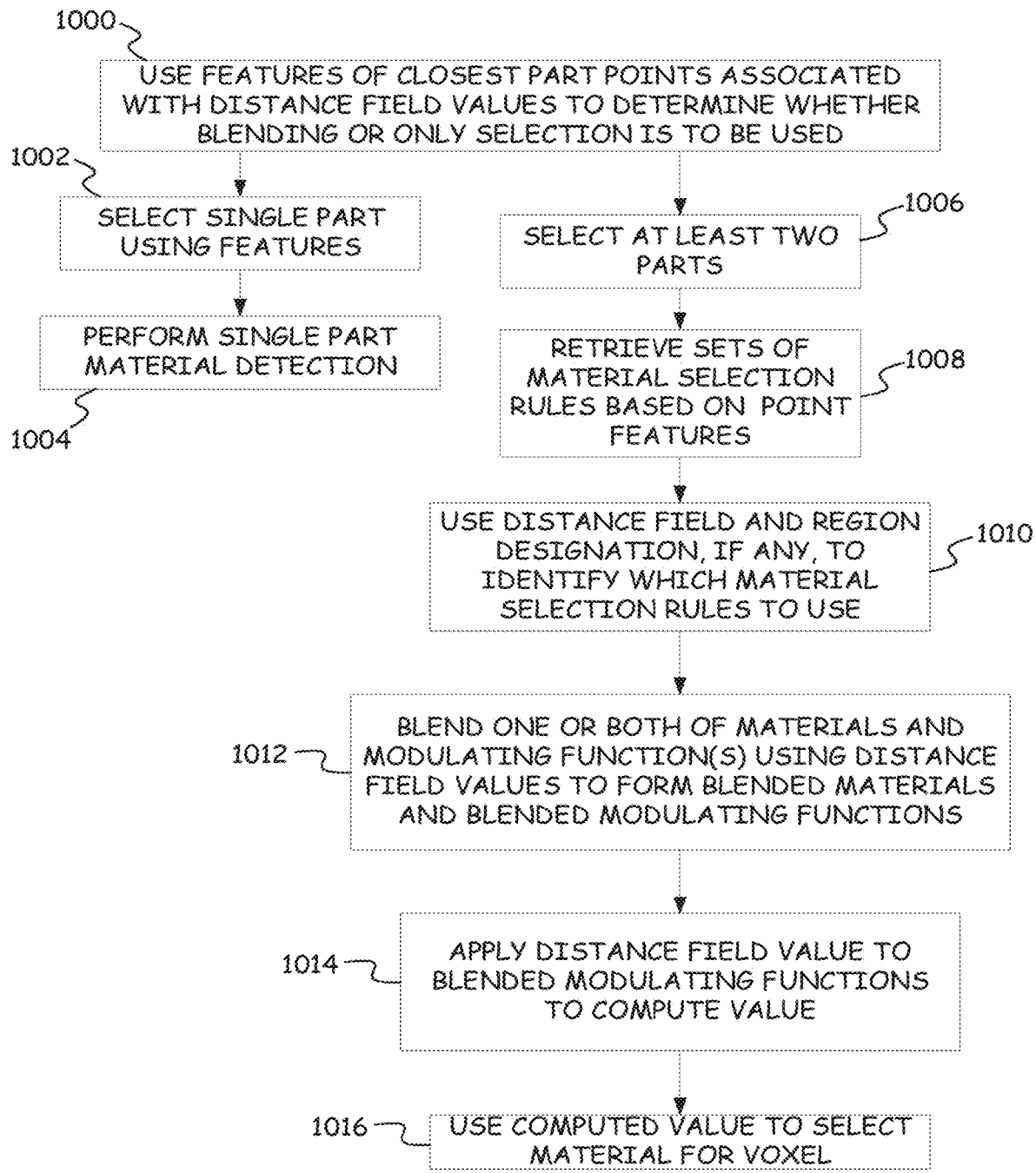
FIG. 12 provides a method of selecting a material for a voxel when there are digital models for multiple parts in the build space.

Returning to the initial processing of FIG. 9, if there is more than one digital part model in the build space, a multipart material selection is performed at step 708 of FIG. 9. FIG. 12 provides a flow diagram of one method for performing a multipart material selection.

At step 1000 of FIG. 12, material selection unit 226 accesses point features 209 to retrieve the features for the closest mesh boundary points 214 for the digital models of the multiple parts. These features are then used to determine whether the material selection rules designated for the mesh boundary point are to be blended with the material selection rules for mesh boundary points of other digital part models or whether a selection is to be made between the material selection rules of the various digital part models so that only a single part's material selection rules are used.

If only a single part's material selection rules are to be used, the process continues at step 1002 where one of the parts is selected using the closest mesh boundary points of the various parts. In particular, the features 209 of the closest mesh boundary points will indicate which of the parts is to be given priority when selecting a set of material selection rules. After the part with priority has been selected at step 1002, single part material selection is performed at step 1004 using the process described above for FIG. 11.

In accordance with some embodiments, features 209 can indicated that Boolean operations are to be performed for the two parts. For example, if an Intersection operation is to be performed for the two parts, features 209 will indicate a material to be used for the voxels when the distance fields for both parts are positive and that no material is to be assigned to a voxel when only one of the distance fields is positive. Similarly, if a Subtraction operation is to be performed, no material is assigned to voxels where the distance field is positive for both parts. When a Union operation is to be performed, the same material is assigned to all of the voxels where the distance field for at least one part is positive.

Figure 13:
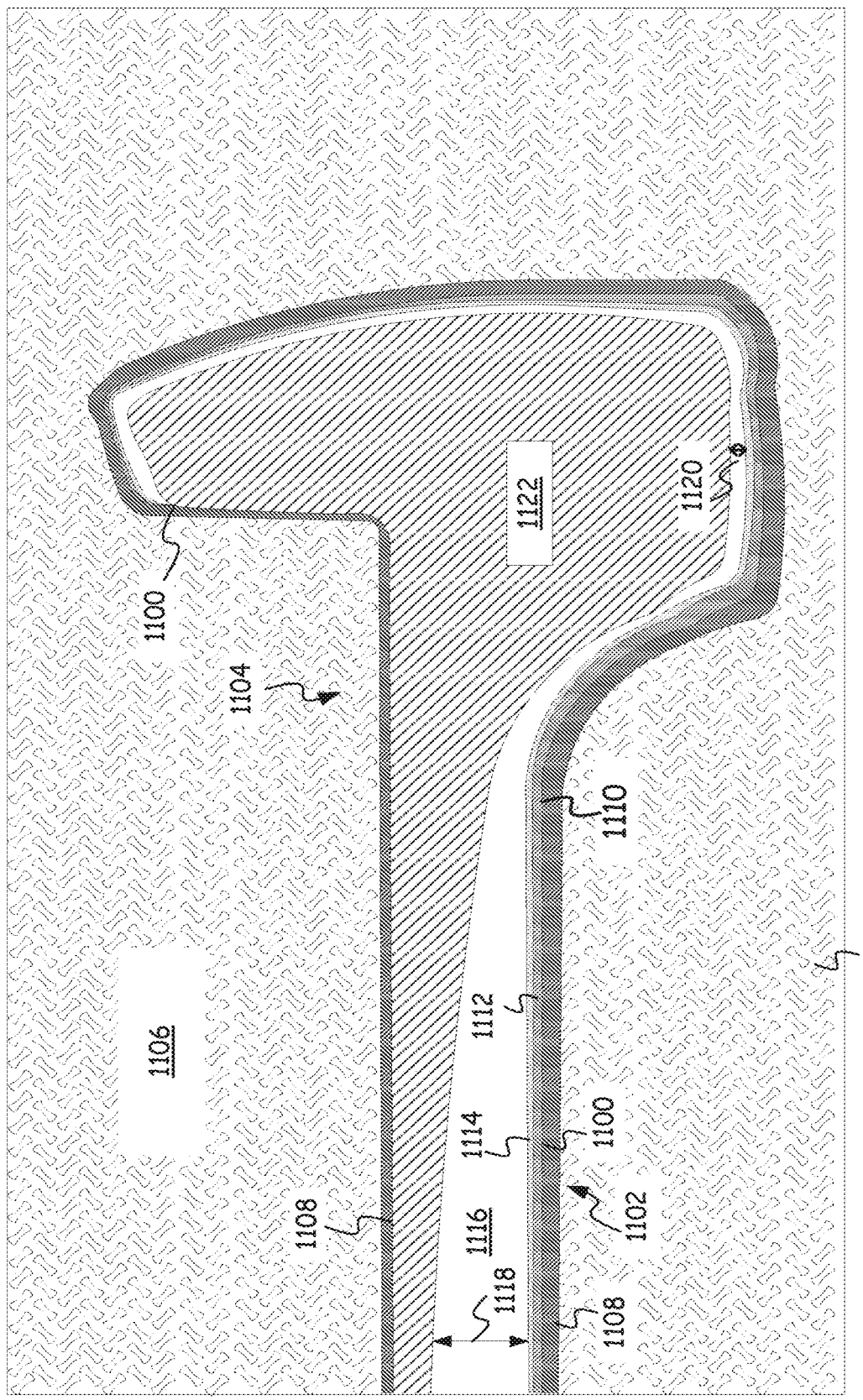
FIG. 13 provides a sectional view of a part constructed through the various embodiments when a digital model of a single part was in the build space.

FIG. 13 provides an example of a top cross-sectional view of a part constructed using the single part construction process of FIG. 11. In FIG. 13, the part, which represents an animal bone, is defined by a mesh boundary 1100 that is divided into two regions 1102 and 1104, each having respective features. For region 1102, three bands of material selection rules are defined outside of the part and four bands of material selection rules are defined inside the part. In particular, outside of the mesh boundary there is a band 1106 constructed by a modulating function that modulates between producing two different materials resulting in a support area with structure. Band 1108 includes an aperiodic modulating function that provides a constant amount of a single support material. Band 1110 consists of an aperiodic modulating function that assigns an air gap to the voxels in the band. In this embodiment, the air gap is produced with a 2D distance field, while the other layers are produced with the 3D distance field. Within the mesh boundary, band 1112 is represented by an aperiodic modulating function that provides a constant density coating material. Band 1114 is described by a modulating function that modulates between the coating of band 1112 and a cortical material found in a cortical band 1116. Cortical band 1116 has a spatially varying thickness along the long direction of the bone as indicated by wider thickness 1118 and narrower thickness 1120. Thus the size of cortical band 1116 varies based on what is the closest mesh boundary point. Cortical band 1116 is described by an aperiodic modulating function that provides a constant intensity cortical material. Band 1122 is described by a noisy modulating function that modulates between the cortical material of band 1116 and a marrow material. The noisy function increases the amount of marrow material as the distance field increases.

Region 1104 contains bands 1106 and 1108 from the exterior of region 1102 but only includes interior band 1122 from region 1102.

Returning to FIG. 12, when the point features 209 for the closest part points indicate that the material selection rules of two different parts are to be blended at step 1000, the process continues at step 1006. In step 1006, at least two of the parts in the build space are selected. The number of parts that are selected is based on designations stored in point features 209 for all of the parts in the build space. Such features can include threshold distance fields that require the voxel to be within a certain distance of the mesh boundary in order for the part's material selection rules to be used during blending. In other embodiments, certain point features 209 will indicate that a part's material selection rules are only to be blended when a certain number of other parts are present in the build space.

At step 1008, material selection rules 220 associated with the parts selected at step 1006 and identified in point features 209 are retrieved. At step 1010, the respective distance field of the voxel and region designation, if any, of the voxel relative to each part selected at step 1006 are used to identify which material selection rules are to be selected for blending. At step 1012, one or both of materials and modulating functions of the selected material selection rules are blended or merged. In accordance with one embodiment, blending or merging modulating functions involves weighting the modulating functions using the distance fields and summing or multiplying the weighted modulating functions to form a merged function. The weighting is such that if a voxel is within two parts, the weight for a modulating function of one of the parts increases as the distance field value for that part increases. When the voxel is located outside of two parts, the opposite is true and the weighting for the modulating function relative to a part decreases as the magnitude of the distance field for the part increases. In other embodiments, the blending or merging is performed by using a random function and selecting which material to apply based on whether the output of the random function is above or below a threshold. The threshold is set as a function of the distance field for one of the parts, such that it becomes more likely that a material of a particular part will be selected for the voxel as the distance field for that part increases. This produces a merged area across the overlapping portions of the two parts where the material content of the voxels changes gradually across the merged area.

After the material/modulating functions have been blended at step 1012, the distance fields for one or more of the parts are applied to the blended functions at step 1014 along with the build space region for the voxel to produce a computed value that is then used to select the material for the voxel at step 1016.

Figure 14:
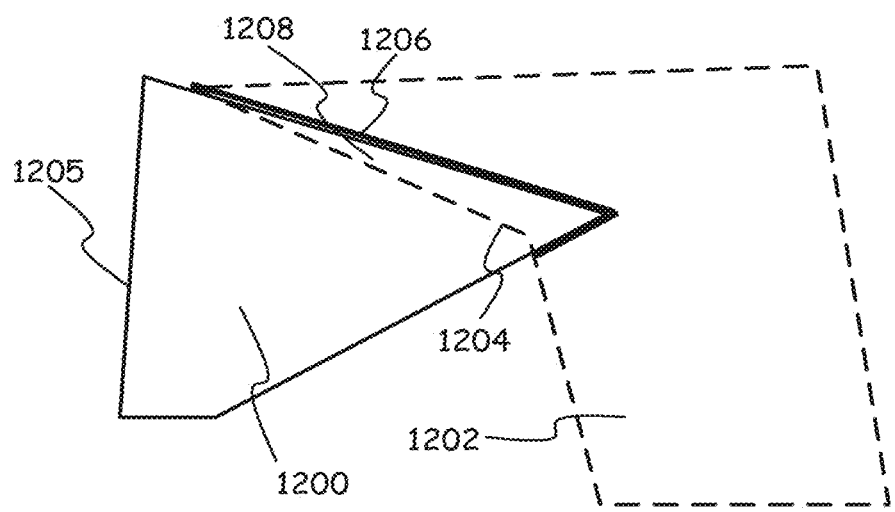
FIG. 14 provides a side view of two parts showing the removal of interference through the selection of a single part's material selection rules.

FIG. 14 provides an example of multiple part material selection in which selecting a single part at step 1002 removes interference between parts. At times, meshes 202 for different parts will be described such that the parts overlap when the designer intended the parts to be separate. Such interference can be time consuming to remove. Under step 1002, such interference is automatically eliminated by selecting only one of the parts when a voxel is described by meshes 202 as being in two different parts.

In the example of FIG. 14, there are two parts 1200 and 1202. Dotted lines 1204 indicate the mesh boundary for part 1202 as described by meshes 202 and solid line 1205 indicates the mesh boundary for pat 1200. As shown in FIG. 14, mesh boundary 1204 is within part 1200 and as such, the description of the mesh boundaries shows interference between parts 1200 and 1202. By selecting a single part at step 1002, in this case, part 1200, it is possible to remove the interference described in the meshes 202 to provide a new part boundary 1206 (shown in bold) for part 1202. Thus, in interference area 1208 where parts 1200 and 1202 overlap, the selection of part 1200 at step 1002 effectively shifts boundary 1204 to boundary 1206 for part 1202, thereby eliminating the interference between the two parts. This in effect performs a Subtraction operation on part 1202 based on part 1200. By comparing the distance fields for two interfering parts, one can remove some interference from one part and the remaining interference. One can also remove enough material to create a desired clearance.

Figure 15:
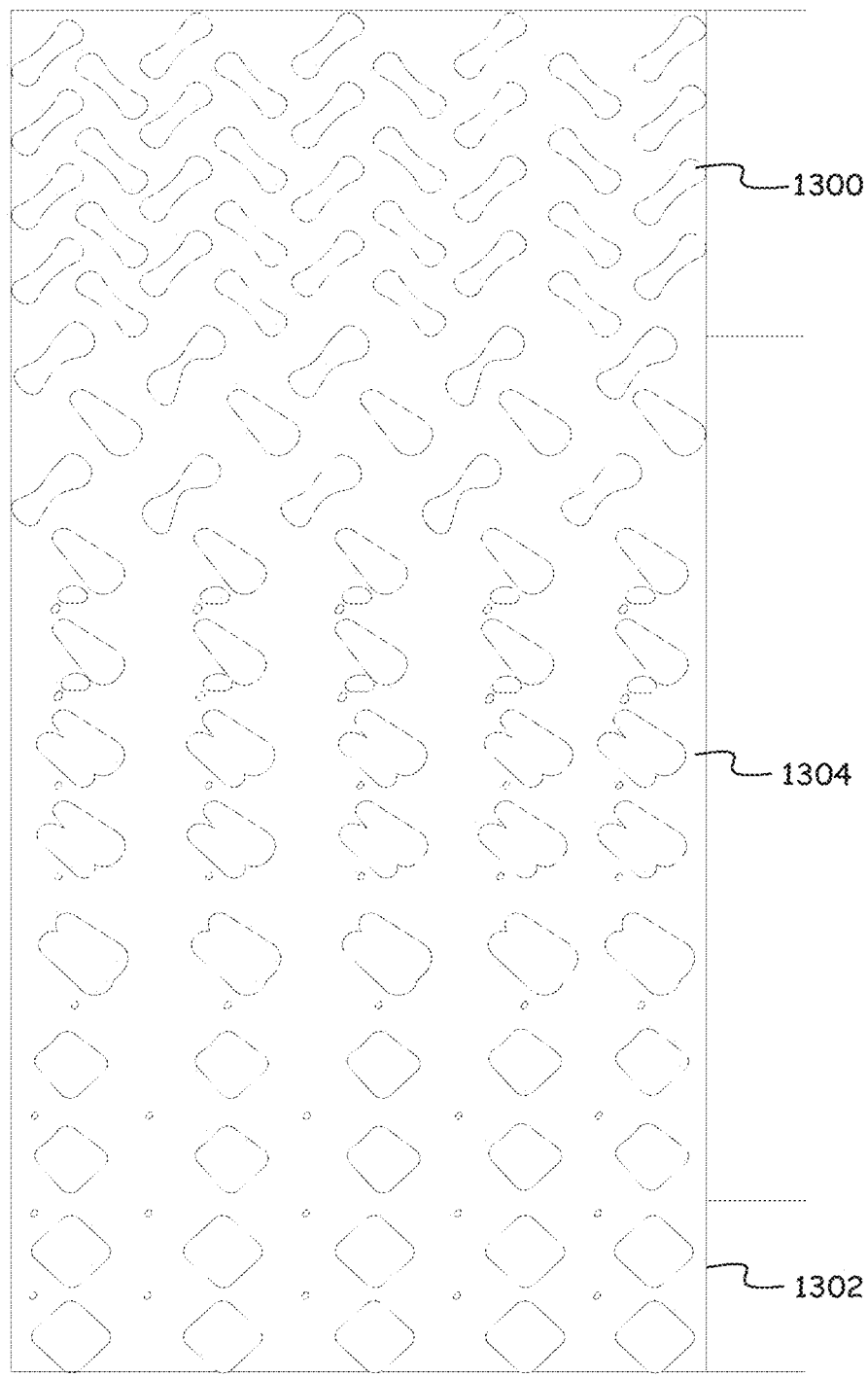
FIG. 15 shows a merged area where two different lattice functions are merged together.

FIG. 15 provides an example of blending two lattice functions using a distance field In FIG. 15, a gyroid modulating field shown in section 1300 is blended with a Schwartz lattice as shown in section 1302 across a blending area 1304. In the blending of FIG. 15, the two lattice functions are weighted such that as the distance field from the mesh boundary defining the gyroid increases, the gyroid modulating function is weighted less and the Schwartz lattice is weighted more. This produces a smooth transition from the gyroid lattice to the Schwartz lattice.

Figure 16:
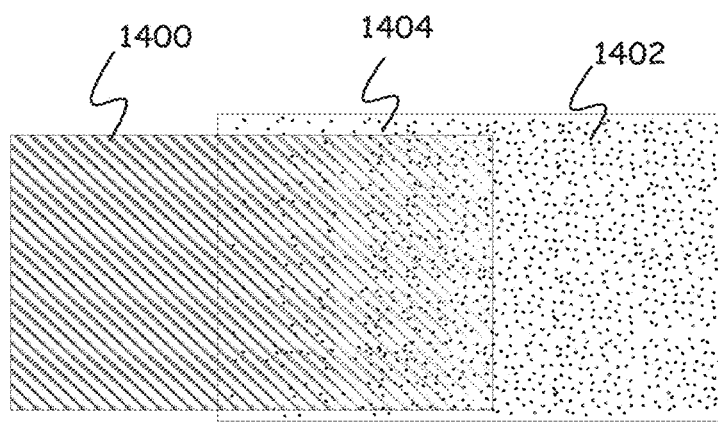
FIG. 16 shows a transition region where two different materials are blended from one to another on a voxel-by-voxel basis.

FIG. 16 shows the blending of parts material across an overlapped portion of two parts 1400 and 1402. In blended region 1404, the amount of material associated with part 1400 gradually decreases and the amount of material associated with part 1402 gradually increases along the extent from part 1400 to part 1402. Thus, as the magnitude of the distance field for part 1400 decreases, the amount of part material for part 1400 decreases in the blended region. Similarly, as the distance field for part 1402 decreases along the blended region 1404, the amount of material associated with part 1402 decreases in the blended region.

Returning to FIG. 3, after the material for a voxel has been determined at step 118, the process determines if more voxels need to be processed at step 120. If there are more voxels in the current slice, a new voxel is selected by returning to step 112 and steps 114, 116, and 118 are repeated for the new voxel. When all of the voxels for the current slice have been processed at step 120, the material bitmap for the slice is complete and is output as material bitmap 228. At step 122, the process determines if there are more slices. If there are more slices, slice computations process 210 moves up one slice at step 124 and then returns to step 104 to perform rendering operations in the −Z direction for the new slice. Steps 106, 108, 110, 112, 114, 116, 118, and 120 are then repeated for the new slice. Note that although the selection of materials for each voxel in a slice has been indicated as being performed before the −Z buffer and +Z-buffer are loaded for each slice, in other embodiments, the rendering operation is performed in the −Z direction and the +Z direction for each slice before determining materials for the voxels in any of the slices. After the −Z buffers and the +Z-buffers have been loaded for each slice, each slice is processed in turn by material selection unit 226 to identify the material for each voxel in the slice.

After material bitmaps 228 have been formed for each slice, a print conversion unit 230 performs a print conversion step 126 to convert this print data into print instructions 237. This print conversion step can be as simple as transferring material bitmaps 228 as bitmaps 232. In other embodiments, material bitmaps 228 are converted into toolpaths 234 that describe how a print head should be moved along a slice to deposit material. In one embodiment, a marching square algorithm is used to identify toolpaths 234 from bitmaps 228. In a further embodiment, the material bitmaps 228 for each slice is converted into meshes 236 that provide three-dimensional descriptions of part boundaries. Such meshes can be applied as input to other printers or as input to CAD systems. In one embodiment, a marching cubes algorithm is used to identify meshes 236 from bitmaps 228. After the material bitmaps 228 have been converted into print instructions 237, the print instructions are communicated or output through communication adapter 92 so that the part can be manufactured at step 128. Since print instructions 237 incorporate the material designations for each voxel, communicating or outputting print instructions 237 involves communicating or outputting the material designations for each voxel for use in building a three-dimensional part using an additive manufacturing system. Alternatively, when meshes 236 are formed, the meshes can be provided to a CAD system at step 128.

In summary, the embodiments above load a CAD model onto a GPU, use the GPU to compute signed distance fields for every voxel, assign a material to each voxel based on the signed distance fields, and outputs images suitable for printing.

As discussed above, the various embodiments compute several different distance fields for each voxel in a slice, including the 3D Euclidean distance to the closest point of the CAD model, the 2D distance to the closest point on the cross section of the model in the slice, and the 2D distance to the silhouette of the model.

Each distance field may include feature transform information for the voxel, where the feature is the source point on the model used to record the distance reported for that voxel in the distance field. Feature transforms may include identifiers of the body or mesh, surface texture coordinates, surface normal, and position of the source point.

In accordance with one embodiment, the material assignment to each voxel becomes a function of the distance information and user-controlled parameters.

The distance metric may be Euclidean norm or a different norm, such as a $L^p$ or a chamfer norm.

The computations on the GPU use the Z-buffer to produce the depth component of distance in planar projections.

The computations on the GPU use a distance transform to compute 3D distance, 2D sectional distance, or distance from self-supporting regions.

The distance fields can be used to modulate carrier functions, such as implicit lattices and noise functions, to produce structures at multiple scales with varying material properties such as elasticity, strength, hardness, elongation at break, Poisson's ratio, density, porosity, color, transparency, effusivity, diffusivity, shininess, absorption, and the speed of light and sound waves, compliance and porosity.

The distance fields can be used to perform offsetting and Boolean operations.

The distance fields can be used to smoothly interpolate from one CAD model to another.

The distance fields can be used to adjust interferences and gaps between parts.

The distance fields can be used to create variable thickness offsets.

The distance fields can be combined with surface and volumetric textures to create layered and rippled textures.

The distance fields can be combined with voxel data, such as CAT scan and MRI data to produce models with volumetrically varying material properties.

The results can be saved as bitmap images for use for printers that use images.

The results can be traced into vector contours for 3D printers that use toolpaths.

The results can be reconstructed into 3D solid models.

The computations on the GPU use convolution, sampling, or linear-time approaches to compute 2D sectional distance, silhouette distance, and the planar components of 3D distance. In accordance with one embodiment, these computations are performed iteratively to recursively compute distances efficiently.

The distance information can be used to modulate explicit and implicit functions, such as those describing lattices, to produce structures with varying bulk material properties such as compliance and porosity. The functions may describe shapes, voids in shapes, textures, varying material properties, and beam-like, honeycomb, and mixed topology lattices.

In the embodiments described below, there are CPU and GPU components. The CPU component:
1. Reads mesh data, textures, and slicing parameter data.
2. Sends the mesh data and related information to the GPU.
3. Provides a user interface to view and interact with the slice data.
4. Saves images created on the GPU to disk.

The GPU component:
1. Produces depth information about the model using the Z-buffer.
2. Calculates distance information from the depth information.
3. Calculates the composition of each voxel using the distance information.
4. Includes libraries for calculating lattices, performing solid modeling operations, calibrating color, etc.

In one embodiment, the various embodiments are implemented using Javascript, Node.js and Electron for the CPU and OpenGL ES for the GPU code. Other embodiments are implemented using C # on .NET or Mono and OpenGL 3.3.

Additional Applications when the distance field is combined with Surface Information:
1. Recording texture, normal, and other geometric information (collectively, "Surface Information") along with distance information while computing the distance field.
2. Using Surface Information and a bitmap to choose a color to assign to the model.
3. Using Surface Information and a bitmap to choose a material among several possible materials, possibly using dithering.
4. Using Surface Information and a bitmap to offset the model to create a physical displacement map.
5. Using Surface Information and a bitmap to change the glossiness of the printed result.
6. Using Surface Information and a bitmap to change the surface finish of the printed result.
7. Using Surface Information and a bitmap to change the hardness of the material closest to the value of the texture on the surface.
8. Using Surface Information and a bitmap to change the transparency of the material closest to the value of the texture on the surface.
9. Using Surface Information and a bitmap to change the mechanical properties, such as elasticity, strength, hardness, elongation at break, Poisson's ratio, density, porosity, color, transparency, effusivity, diffusivity, absorption, and the speed of light and sound waves, compliance and porosity, of the material closest to the value of the texture on the surface.
10. Using Surface Information and a bitmap to alter the presence of support material on the surface of a part.
11. Using Surface Information and a bitmap to modulate implicit functions used in the volume of the part or in support structures surrounding it.
12. Using Surface Information and several bitmaps to produce several displacement maps that can be combined via Boolean operations to create surface textures that include overhang.
13. Using Surface Information and several bitmaps with transparent material to produce lenticular (animated or 3D) surface effects.
14. Using any combination of 2-13 together.
15. The use of 3D volumetric textures with distance field information to change material composition, possibly in combination with 2-13.

Figure 17:
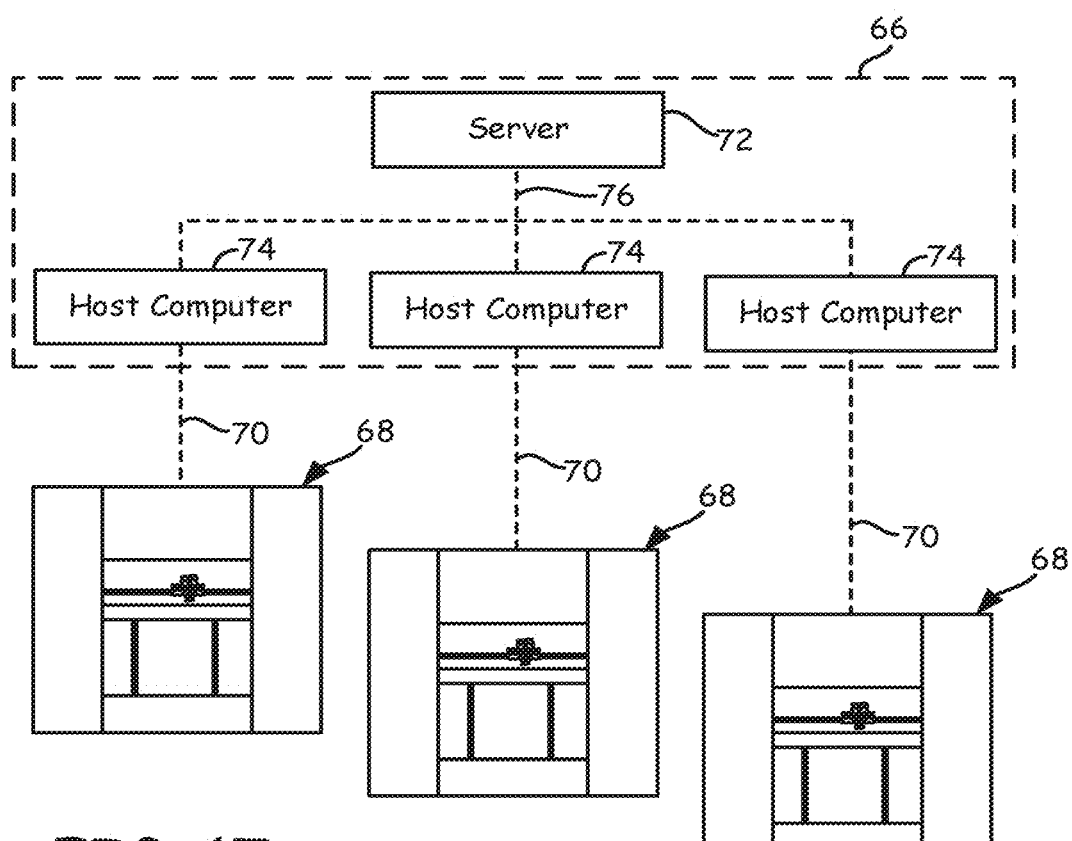
FIG. 17 is a second example system for printing a 3D part using GPU material assignment based on distance fields, which includes multiple additive manufacturing systems.

In FIG. 1, computer 66 was shown as a host for a single stand-alone additive manufacturing system. Alternatively, as shown in FIG. 17, computer 66 may function as a local server for multiple additive manufacturing systems 68. For example, systems 68 may be part of an overall production system to manufacture consumer or industrial OEM products. As such, computer 66 and may perform the steps of FIG. 3 and may also perform one or more additional processing steps, such as run-time estimates, printer queuing, post-processing queuing, and the like. As shown, computer 66 may optionally include one or more servers 72 and one or more dedicated host computers 74 associated with each system 68, where server 72 may communicate with host computers 74 over one or more communication lines 76 (e.g., network lines).

Figure 18:
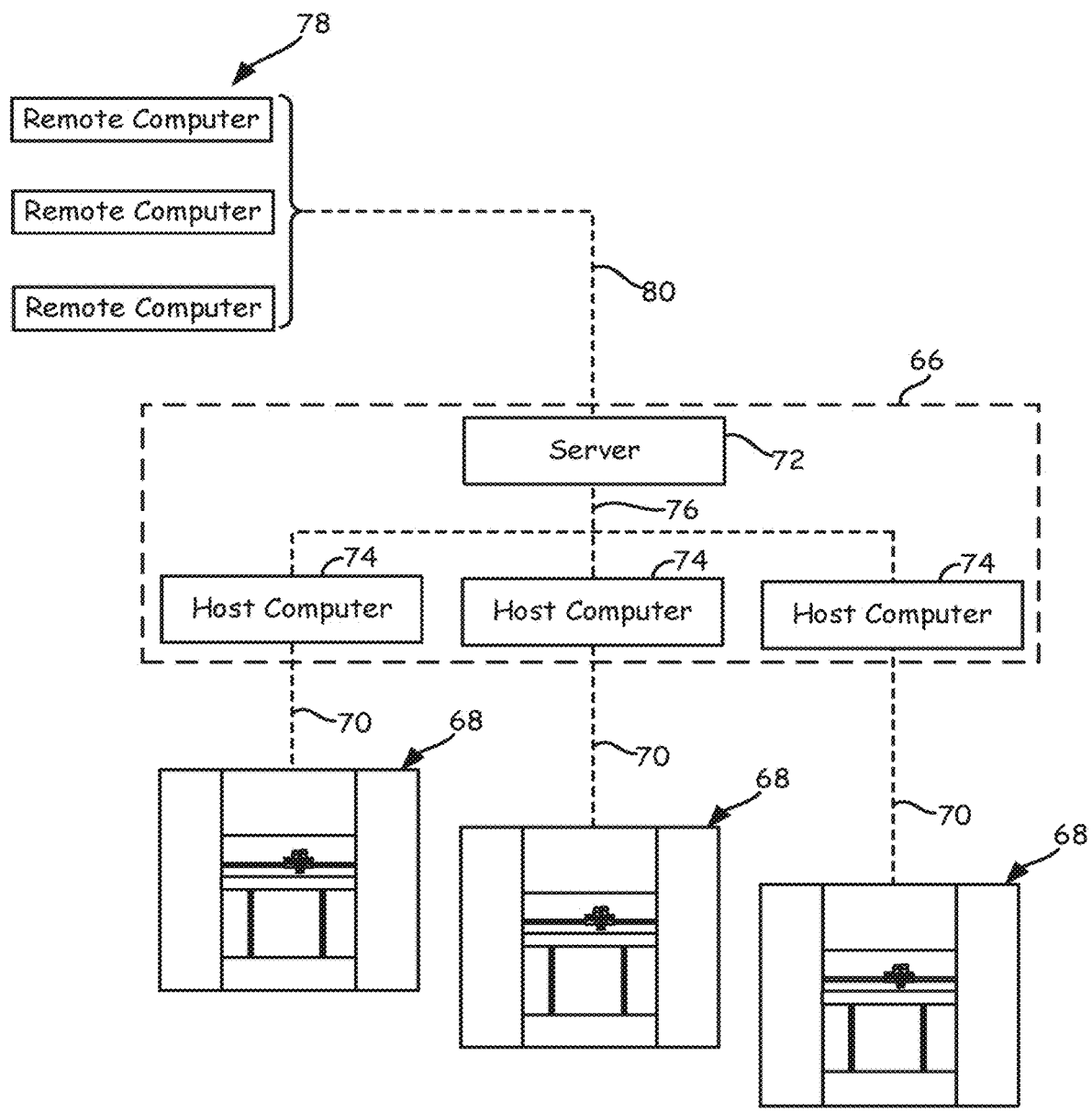
FIG. 18 is a third example system for printing a 3D part using GPU material assignment based on distance fields, which includes multiple additive manufacturing systems and a cloud-based server architecture.

In yet another embodiment, as shown in FIG. 18, computer 66 and systems 68 may be part of an on-demand service center. In this embodiment, computer 66 may function as a cloud-based server, for example, where customers may submit digital models (e.g., mesh data files) from their personal computers 78 over the Internet via one or more network or communication lines 80 to computer 66 (e.g., to server 72).

In this application, computer 66 may perform the steps of FIG. 3 as well as one or more additional processing steps, such as support material volume calculations, price quoting, run-time estimates, printer queuing, post-processing queuing, shipping estimates, and the like. For example, in some embodiments, computer 66 may generate support material volume calculations, build times, and price quoting as discussed in Nehme et al., U.S. Pat. No. 8,818,544. The service center may also include one or more post-printing stations (e.g., support removal stations, surface finishing stations, shipping stations, and the like, not shown), where computer 66 may also optionally communicate with the post-printing station(s).

As used herein, the term "computer" refers to one or more computer systems, such as one or more personal computers, laptop computers, local servers, cloud-based servers, mobile media devices, computer tablet devices, and the like.

Figure 19:
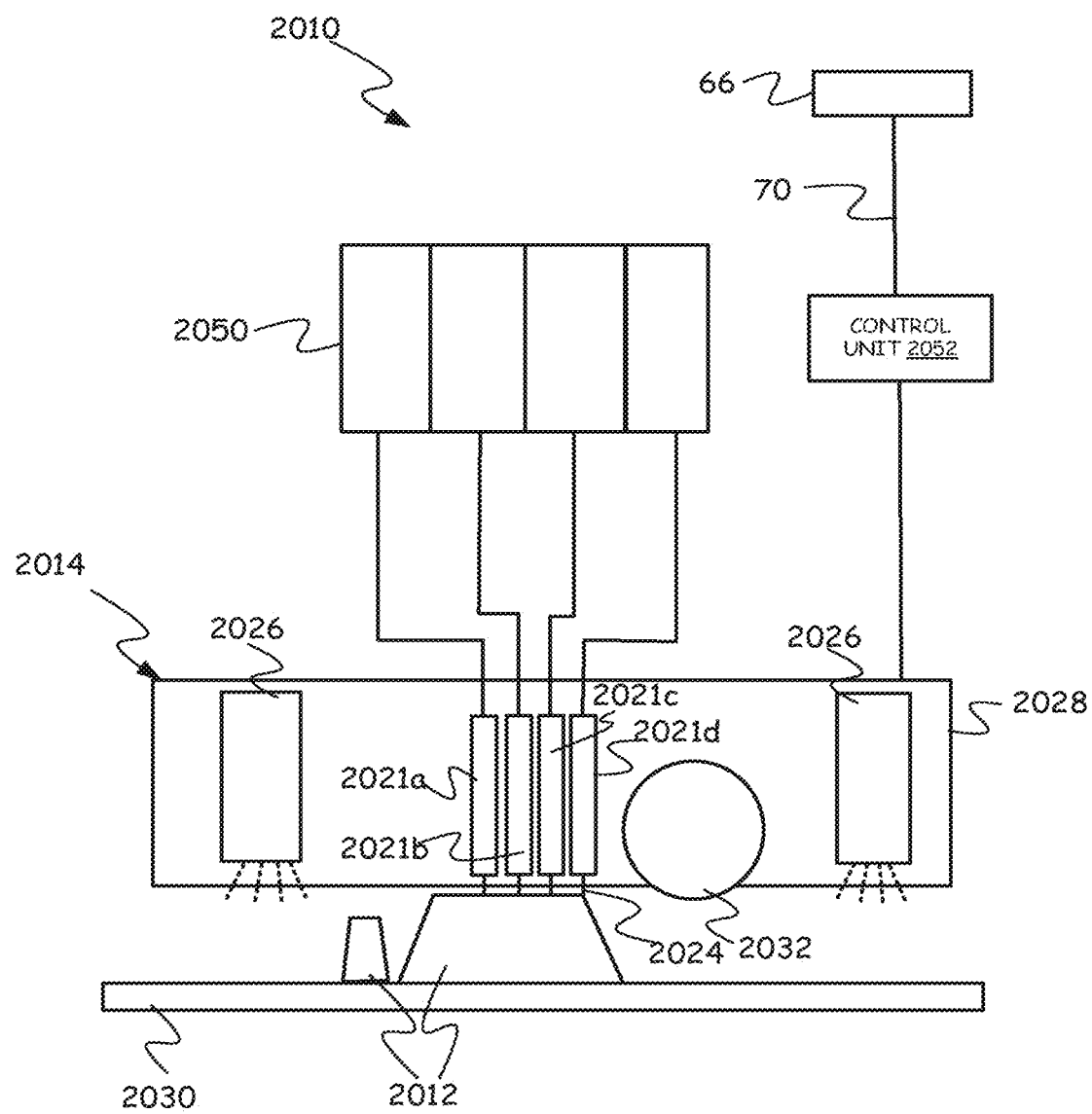
FIG. 19 is a front view of an example ink jet additive manufacturing system configured to print 3D parts and support structures, for use in the example systems.

A representative and non-limiting example of an additive manufacturing system 2010 that can be used with the various embodiments is illustrated in FIG. 19. Details on the principles and operations of additive manufacturing systems such as system 2010 are found in U.S. Published Application No. 20100191360 and U.S. Pat. Nos. 8,147,910; and 9,227,365, the contents of which are hereby incorporated by reference.

Additive manufacturing system 2010 uses a jet printing apparatus 2014 to manufacture a three-dimensional object 2012 based on bitmaps and instructions from computer 66. Suitable additive manufacturing systems for system 2010 include jetting systems developed by Stratasys Ltd., Rehovot, IL under the trademark "PolyJet". Representative examples of other additive manufacturing apparatus contemplated according to various exemplary embodiments include, without limitation, binder jet-powder base apparatus.

Jet printing apparatus 2014 includes dispensing heads 2021a, 2021b, 2021c, and 2021d, radiation sources 2026 and leveling devices 2032, which are all mounted in a moveable frame or block 2028. Each head receives part or support material 2024 from a respective supply container 2050 and preferably comprises an array of one or more nozzles through which the part and support materials 2024 are dispensed. Preferably, but not obligatorily, the part and support materials are dispensed via inkjet technology. Frame 2028 moves over a tray 2030, which serves as the working surface on which object 2012 is built. Tray 2030 is preferably configured to move vertically (along the Z direction), typically downward.

In use, a controller 2052 provides control instructions to various components of system 2010 based on the bitmaps and instructions from computer 66 to cause system 2010 to manufacture object 2012. In particular, the instructions from controller 2052 cause dispensing heads 2021 to be moved in a scanning direction and selectively dispense support and/or part material in a predetermined configuration in the course of their passage over tray 2030. The passage of heads 2021 is followed by the curing of the modeling material(s) by radiation sources 2026. In the reverse passage of heads 2021, back to their starting point for the layer just deposited, an additional dispensing of building material may be carried out, according to predetermined configuration. In the forward and/or reverse passages of heads 2021, the layer thus formed may be straightened by leveling device 2032, which preferably follows the path of heads 2021 in their forward and/or reverse movement. Once heads 2021 return to their starting point along the X direction, they may move to another position along an indexing direction, referred to herein as the Y direction, and continue to build the same layer by reciprocal movement along the X direction.

Once the layer is completed, tray 2030 is lowered in the Z direction to a predetermined Z level, according to the desired thickness of the layer subsequently to be printed. The procedure is repeated to form three-dimensional object 2012 in a layer wise manner.

Figure 20:
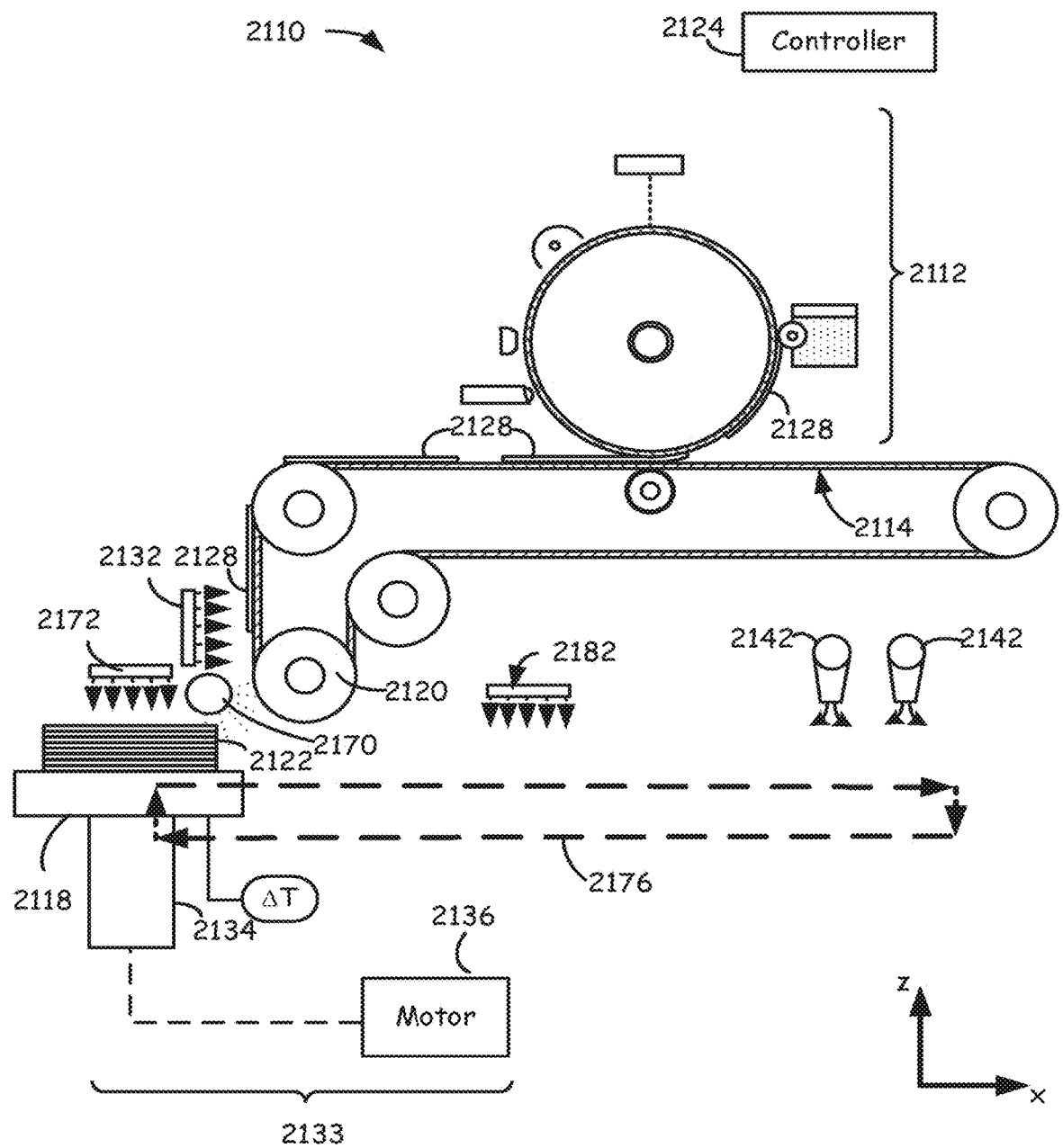
FIG. 20 is a diagram of an electrophotography manufacturing system configured to print 3D parts and support structures for use in the example systems.

FIG. 20 shows a system 2110 that is an example additive manufacturing system for printing 3D parts and support structures using electrophotography, which can be used to print 3D objects based on the print data formed through the various embodiments. Examples of suitable components and functional operations for system 2110 include those disclosed in U.S. patent application Ser. Nos. 13/790,406, 13/242,669 and 13/242,841, which are hereby incorporated by reference.

As discussed in the U.S. patent application Ser. Nos. 13/790,406, 13/242,669 and 13/242,841, EP engine 2112 is configured to develop successive layers 2128 of a thermoplastic-based powder using electrophotography. The developed layers 2128 are then transferred from EP engine 2112 to belt 2114. Belt 2114 conveys developed layers 2128 from EP engine 2112 to layer transfusion assembly 2133, which transfuses developed layers 2128 onto build platform 2118 or previously transfused layers of part 2122. Layer transfusion assembly 2133 includes a heater 2132, located upstream from build platform 2118, a heated nip roller 2120, part heaters 2170 and 2172, and gantry 2134. Heater 2132 heats layers 2128 to at least a fusion temperature of the material prior to reaching build platform 2118. Part heaters 2170 and 2172 heat part 2122. As developed layers 2128 pass around nip roller 2120, build platform 2118 is moved by gantry 2134 along path 2176. The movement of build platform 2118 is operated by motor 2136 based on commands from controller 2124. The continued rotation of belt 2114 and the movement of build platform 2118 align the heated layer 2128 with the heated top surface of 3D part 2122. Gantry 2134 continues to move build platform part 2122 at a rate that is synchronized with the rotational rate of belt 2114. This presses the heated layer 2128 between the heated top surface of 3D part 2122 and belt 2114 at the location of nip roller 2120 and transfuses heated layer 2128 to the top layer of 3D part 2122.

After release of layer 2128 onto part 2122, gantry 2134 continues to move build platform 2118 and 3D part 2122 to an optional post-fuse heater 2182. Additionally, gantry 2134 continues to move part 2122 to air jets 2142, which blow cooling air towards the top layers of 3D part 2122. This actively cools the transfused layer.

Gantry 2134 then moves build platform 2118 and 3D part 2122 downward and back to a starting position following the reciprocating rectangular pattern 2176.

Figure 21:
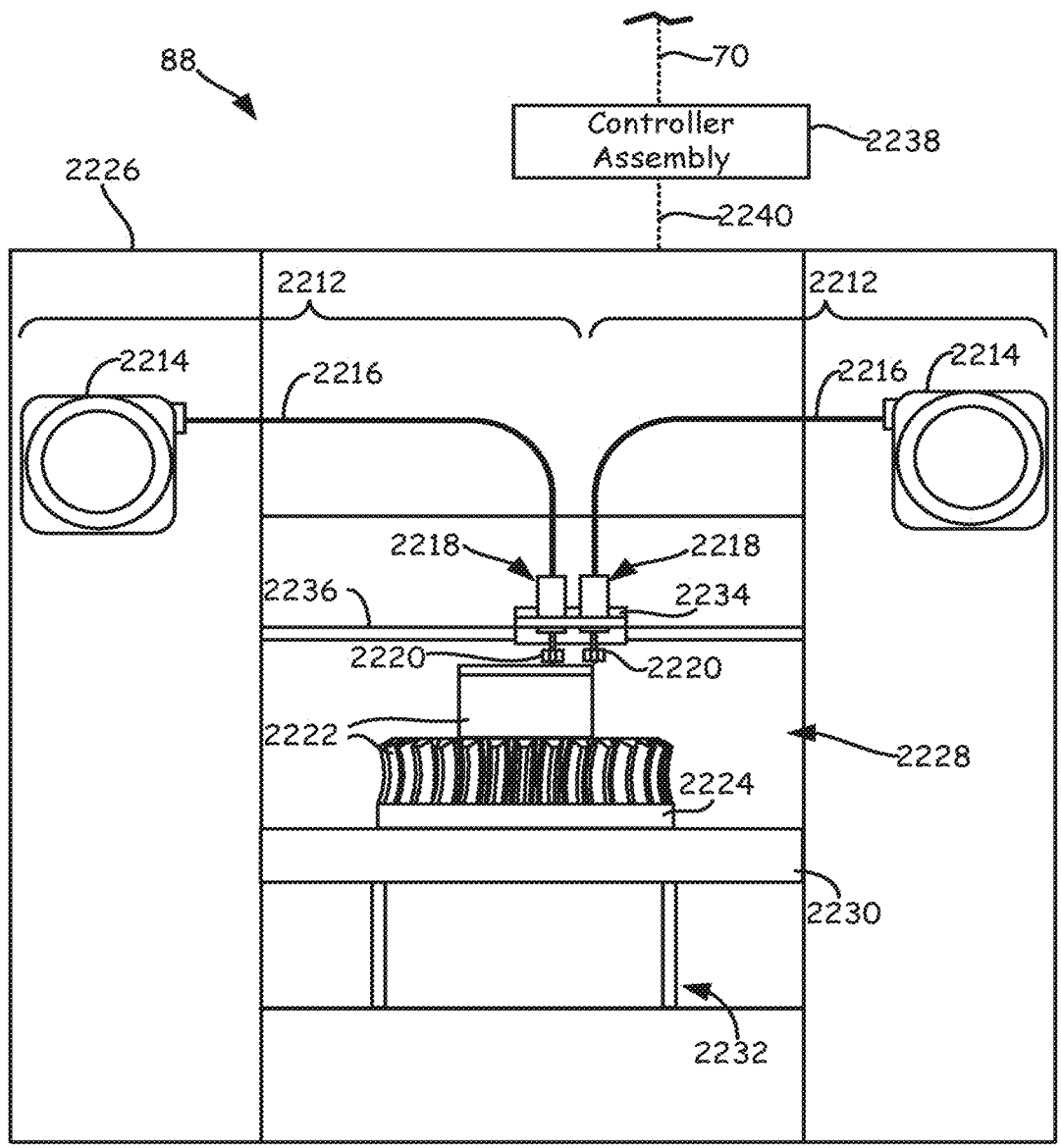
FIG. 21 is a diagram of an extrusion-based additive manufacturing system configured to print 3D parts and support structures for use in the example systems.

FIG. 21 is a diagram of an example extrusion-based additive manufacturing system 88 configured to print 3D parts and support structures for use in the example systems. Suitable additive manufacturing systems for system 88 include extrusion-based systems developed by Stratasys, Inc., Eden Prairie, MN, such as fused deposition modeling systems under the trademark "FDM". Details on the principles and operations of additive manufacturing systems such as system 88 are found in U.S. Pat. No. 9,022,769, the contents of which are hereby incorporated by reference.

In FIG. 21, there are two consumable assemblies 2212, where one of the consumable assemblies 2212 contains a part material filament, and the other consumable assembly 2212 contains a support material filament. Each consumable assembly 2212 includes container portion 2214, guide tube 2216, and print heads 2218, where each print head 2218 includes an extruder 2220. Container portion 2214 may retain a spool, coil, or other supply arrangement of a consumable filament, such as discussed in Mannella et al., U.S. Publication Nos. 2013/0161432 and 2013/0161442; and in Batchelder et al., U.S. Publication No. 2014/0158802.

Guide tube 2216 interconnects container portion 2214 and print head 2218, where a drive mechanism of print head 2218 (and/or of system 88) draws successive segments of the consumable filament from container portion 2214, through guide tube 2216, to the extruder 2220.

As shown, system 88 includes system housing 2226, chamber 2228, platen 2230, platen gantry 2232, head carriage 2234, and head gantry 2236. Chamber 2228 is an enclosed environment that contains platen 2230 for printing 3D part 2222 and support structure 2224. Platen gantry 2232 is a gantry assembly configured to move platen 2230 along (or substantially along) the vertical z-axis. Head carriage 2234 is a unit configured to receive print heads 2218 and is supported by head gantry 2236. Examples of suitable devices for head carriage 2234, and techniques for retaining print heads 2218 in head carriage 2234, include those disclosed in Swanson et al., U.S. Pat. Nos. 8,403,658 and 8,647,102. Head gantry 2236 is a belt-driven gantry assembly configured to move head carriage 2234 and the retained print heads 2218 in a horizontal x-y plane above chamber 2228. Examples of suitable gantry assemblies for head gantry 2236 include those disclosed in Comb et al., U.S. Publication No. 2013/0078073, where head gantry 2236 may also support deformable baffles (not shown) that define a ceiling for chamber 2228.

Additional examples of suitable devices for print heads 2218, and the connections between print heads 2218, head carriage 2234, and head gantry 2236 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Batchelder et al., U.S. Pat. Nos. 7,896,209 and 7,897,074; and Comb et al., U.S. Pat. No. 8,153,182.

System 88 also includes controller assembly 2238, which is one or more computer-based systems configured to operate the components of system 88. Controller assembly 2238 may communicate over communication line(s) 2240 with the various components of system 88, such as print heads 2218, chamber 2228, head carriage 2234, motors for platen gantry 2232 and head gantry 2236, and various sensors, calibration devices, display devices, and/or user input devices.

Additionally, controller assembly 2238 may also communicate over communication line 70 with external devices, such as computer 66.

During a printing operation, controller assembly 2238 directs platen gantry 2232 to move platen 2230 to a predetermined height within chamber 2228. Controller assembly 2238 then directs head gantry 2236 to move head carriage 2234 and print heads 2218 around in the horizontal x-y plane above chamber 2228 along a tool path provided by computer 66. Controller assembly 2238 then commands print heads 2218 to selectively draw successive segments of the consumable filaments from container portions 2214 and through guide tubes 2216, respectively. The successive segments of each consumable filament are then melted in the extruder 2220 of the respective print head 2218 to produce a molten material. Upon exiting extruder 2220, the resulting extrudate is deposited onto platen 2230 as a series of roads for printing 3D part 2222 or support structure 2224 in a layer-by-layer manner.

Although the present disclosure has been described with reference to preferred embodiments, workers skilled in the art will recognize that changes may be made in form and detail without departing from the spirit and scope of the disclosure.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of generating additive manufacturing data for additive manufacturing, the method comprising:
   receiving a digital model of an object in a build space defined over a plurality of voxels;
   computing over said build space a distance field associating a vector to each voxel;
   assigning a building material to each voxel based on at least one periodic function of a respective vector associated with said voxel, wherein said at least one periodic function is selected to define a lattice structure in said build space;
   generating additive manufacturing data pertaining to said building material assignments for printing said object in layers by additive manufacturing.

2. The method of claim 1, wherein said at least one periodic function comprises a plurality of periodic functions, each defining a different lattice type, and wherein said assigning comprises applying different periodic functions to voxels of said plurality of voxels which define different portions of said build space.

3. The method of claim 2, comprising combining two or more of said plurality of periodic functions to provide a merged periodic function, wherein said assigning comprises applying said merged periodic function to voxels of said a plurality of voxels which define a portion of said build space to ensure that said building material assignments form a lattice blending region in said object.

4. The method of claim 3, comprising gradually varying said combination of periodic functions such as to ensure a gradual transition between different lattice types in said lattice blending region.

5. The method of claim 1, wherein said plurality of voxels are arranged in slices, each describing one of said layers, and wherein at least one vector of said distance field has a component which is vertical with respect to said slices.

6. The method of claim 5, comprising computing, for at least one voxel in said build space, a first and a second z-buffer values, said first z-buffer value representing a vertical component of a vector from said at least one voxel to a boundary of said object above said at least one voxel, and said second z-buffer value representing a vertical component of a vector from said at least one voxel to a boundary of said object below said at least one voxel.

7. The method of claim 1, wherein said plurality of voxels are arranged in slices, each describing one of said layers, and the method comprises computing z-buffer values over said build space, each z-buffer value representing a component of a respective vector which is vertical with respect to said slices.

8. The method of claim 7, wherein said computing said z-buffer values comprises comparing a maximal z-buffer value to vertical distances between voxels of said plurality of voxels and a boundary of said object, and assigning said z-buffer values responsively to said comparison.

9. The method of claim 1, wherein said receiving comprises transmitting said digital model from a CPU of a computer to a GPU of said computer, wherein said computing, said assigning, and said generating is by said GPU.

10. The method of claim 9, comprising transmitting said additive manufacturing data from said GPU to said CPU and instructing said CPU to store said additive manufacturing data on a medium readable by a controller of an additive manufacturing system.

11. The method of claim 1, comprising calculating silhouette boundaries of the digital model based on said distance field.

12. The method of claim 1, wherein said assigning said building materials comprises, for each voxel, assigning no material to said voxel when an output value of said periodic function is in a first range, and assigning a material to said voxel when said output value of said periodic function is in a second range.

13. A method of additive manufacturing, comprising executing the method of claim 1, and printing said object according to said additive manufacturing data.

14. A system for generating additive manufacturing data for additive manufacturing of an object described by a digital model in a three-dimensional build space defined over a plurality of voxels, the system comprising:
   an image processor, being in communication with a controller of an additive manufacturing system and having a circuit configured to receive the digital model, to compute over said build space a distance field associating each voxel with a vector, to assign a building material to each voxel based on at least one periodic function of a respective vector associated with said voxel, said at least one periodic function being selected to define a lattice structure in said build space, and to generate additive manufacturing data pertaining to said building material assignments for transmission of the additive manufacturing data to said controller.

15. The system of claim 14, wherein said at least one periodic function comprises a plurality of periodic functions each defining a different lattice type, and wherein said circuit is configured to apply different periodic functions to voxels of said plurality of voxels which define different portions of said build space.

16. The system of claim 15, wherein said circuit is configured to combine two or more of said plurality of periodic functions to provide a merged periodic function, and to apply said merged periodic function to voxels of said plurality of voxels which define a portion of said build space to ensure that said building material assignments form a lattice blending region in said object.

17. The system of claim 16, wherein said to gradually vary said combination of periodic functions such as to ensure a gradual transition between different lattice types in said lattice blending region.

18. The system of claim 14, wherein said plurality of voxels are arranged in slices, each describing a layer of the object, and wherein at least one vector of said distance field has a component which is vertical with respect to said slices.

19. An additive manufacturing system, comprising:
the system of claim 14, including said controller; and
a dispensing head for forming said object in layers by dispensing building materials according to said additive manufacturing data, wherein said plurality of voxels are arranged in slices, each describing one layer of the object.

20. A three-dimensional object, manufactured by additive manufacturing, and comprising:
a first periodic lattice structure within a first layered region of the object;
a second periodic lattice structure within a second layered region of the object; and
a blending of said first periodic lattice structure and said second periodic lattice structure within a layered lattice blending region extending from said first region to said second region within said object.

* * * * *